United States Patent
Kang et al.

(10) Patent No.: US 12,200,693 B2
(45) Date of Patent: Jan. 14, 2025

(54) METHOD AND DEVICE FOR REPEATEDLY TRANSMITTING UPLINK CHANNEL IN WIRELESS COMMUNICATION SYSTEM

(71) Applicant: LG ELECTRONICS INC., Seoul (KR)

(72) Inventors: Jiwon Kang, Seoul (KR); Hyungtae Kim, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 356 days.

(21) Appl. No.: 17/758,737

(22) PCT Filed: Jan. 29, 2021

(86) PCT No.: PCT/KR2021/001214
§ 371 (c)(1),
(2) Date: Jul. 13, 2022

(87) PCT Pub. No.: WO2021/154031
PCT Pub. Date: Aug. 5, 2021

(65) Prior Publication Data
US 2023/0048329 A1    Feb. 16, 2023

(30) Foreign Application Priority Data
Jan. 30, 2020 (KR) .................. 10-2020-0011413

(51) Int. Cl.
*H04W 72/1268* (2023.01)
*H04W 16/28* (2009.01)
*H04W 72/23* (2023.01)

(52) U.S. Cl.
CPC ....... *H04W 72/1268* (2013.01); *H04W 16/28* (2013.01); *H04W 72/23* (2023.01)

(58) Field of Classification Search
CPC . H04W 72/23; H04W 72/1268; H04W 16/28; H04L 1/08; H04L 5/0023; H04L 5/0048; H04B 7/0695
See application file for complete search history.

(56) References Cited

U.S. PATENT DOCUMENTS

2019/0020453 A1    1/2019 Xu et al.
2021/0029650 A1*   1/2021 Cirik .................. H04W 52/248

FOREIGN PATENT DOCUMENTS

WO    2019-190377    10/2019

OTHER PUBLICATIONS

PCT International Application No. PCT/KR2021/001214, International Search Report dated Apr. 28, 2021, 4 pages.
(Continued)

*Primary Examiner* — Sulaiman Nooristany
(74) *Attorney, Agent, or Firm* — LEE, HONG, DEGERMAN, KANG & WAIMEY

(57) ABSTRACT

A method and a device for repeatedly transmitting an uplink channel in a wireless communication system are disclosed. The method for repeatedly transmitting an uplink channel, according to one embodiment of the disclosure, can comprise the steps of: receiving configuration information related to the repeated transmission of N (N is a natural number) number of resource units (RUs) of an uplink channel; receiving downlink control information (DCI); and transmitting the uplink channel on the basis of the configuration information.

13 Claims, 14 Drawing Sheets

(56) References Cited

OTHER PUBLICATIONS

NTT Docomo Inc., "Discussion on multi-beam enhancement," R1-1906225, 3GPP TSG RAN WG1 #97, May 2019, 25 pages.
Mediatek Inc., "On repetition schemes for NR PUSCH," R1-1911080, 3GPP TSG RAN WG1 Meeting #98bis, Oct. 2019, 4 pages.
Ericsson, "New MAC CE for indicating spatial resource for PUCCH resources," R2-1914713, 3GPP TSG RAN WG2 #108, Nov. 2019, 5 pages.

* cited by examiner

METHOD AND DEVICE FOR REPEATEDLY TRANSMITTING UPLINK CHANNEL IN WIRELESS COMMUNICATION SYSTEM

CROSS-REFERENCE TO RELATED APPLICATIONS

This application is the National Stage filing under 35 U.S.C. 371 of International Application No. PCT/KR2021/001214, filed on Jan. 29, 2021, which claims the benefit of earlier filing date and right of priority to Korean Application No. 10-2020-0011413, filed on Jan. 30, 2020, the contents of which are all hereby incorporated by reference herein in their entireties.

TECHNICAL FIELD

The present disclosure relates to a wireless communication system, and in more detail, relates to a method and an apparatus of repeatedly transmitting an uplink channel in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus in which a terminal repeatedly transmits an uplink channel.

In addition, an additional technical object of the present disclosure is to provide a method and an apparatus in which a terminal repeatedly transmits an uplink channel based on a spatial relation reference signal.

In addition, an additional technical object of the present disclosure is to provide a method and an apparatus of mapping with a spatial relation reference signal when dropping occurs while a terminal repeatedly transmits an uplink channel.

The technical objects to be achieved by the present disclosure are not limited to the above-described technical objects, and other technical objects which are not described herein will be clearly understood by those skilled in the pertinent art from the following description.

Technical Solution

A method of repeatedly transmitting an uplink channel in a wireless communication system according to an aspect of the present disclosure may include receiving configuration information related to repeat transmission in N (N is a natural number) resource unit (RU) of the uplink channel; receiving downlink control information (DCI); and transmitting the uplink channel based on the configuration information. Based on configured mapping method, the N RUs may be mapped to K spatial relation reference signals, the uplink channel may be transmitted based on the K spatial relation reference signals, based on a downlink channel being scheduled in a k-th ($0 \leq k \leq N-1$, k is a natural number) RU among the N RUs by the DCI, the uplink channel may be transmitted in the N RUs except for the k-th RU, and the configured mapping method may be maintained to map the K spatial relation reference signals to the n-th ($k+1 \leq n \leq N-1$) RU.

A method of transmitting an uplink channel in a wireless communication system according to an additional aspect of the present disclosure may include at least one transceiver for transmitting and receiving a wireless signal; and at least one processor for controlling the at least one transceiver. The at least one processor may be configured to: receive configuration information related to repeat transmission in N (N is a natural number) resource unit (RU) of the uplink channel; receive downlink control information (DCI); and transmit the uplink channel based on the configuration information. Based on configured mapping method, the N RUs may be mapped to K spatial relation reference signals, the uplink channel may be transmitted based on the K spatial relation reference signals, based on a downlink channel being scheduled in a k-th ($0 \leq k \leq N-1$, k is a natural number) RU among the N RUs by the DCI, the uplink channel may be transmitted in the N RUs except for the k-th RU, and the configured mapping method may be maintained to map the K spatial relation reference signals to the n-th ($k+1 \leq n \leq N-1$) RU.

A method of repeatedly receiving an uplink channel in a wireless communication system according to an aspect of the present disclosure may include transmitting configuration information related to repeat transmission in N (N is a natural number) resource unit (RU) of the uplink channel; transmitting downlink control information (DCI); and receiving the uplink channel based on the configuration information. Based on configured mapping method, the N RUs may be mapped to K spatial relation reference signals, the uplink channel may be transmitted based on the K spatial relation reference signals, based on a downlink channel being scheduled in a k-th ($0 \leq k \leq N-1$, k is a natural number) RU among the N RUs by the DCI, the uplink channel may be transmitted in the N RUs except for the k-th RU, and the configured mapping method may be maintained to map the K spatial relation reference signals to the n-th ($k+1 \leq n \leq N-1$) RU.

At least one non-transitory computer-readable medium storing at least one instruction, wherein the at least one instruction executable by at least one processor may control a device to: receive configuration information related to repeat transmission in N (N is a natural number) resource unit (RU) of the uplink channel; receive downlink control information (DCI); and transmit the uplink channel based on the configuration information. Based on configured mapping method, the N RUs may be mapped to K spatial relation reference signals, the uplink channel may be transmitted based on the K spatial relation reference signals, based on a downlink channel being scheduled in a k-th ($0 \leq k \leq N-1$, k is a natural number) RU among the N RUs by the DCI, the uplink channel may be transmitted in the N RUs except for the k-th RU, and the configured mapping method may be maintained to map the K spatial relation reference signals to the n-th (k+1≤n≤N−1) RU.

A processing apparatus configured to control a terminal for repeatedly transmitting an uplink channel in a wireless communication system, the processing apparatus may include at least one processor; and at least one computer memory operably connected to the at least one processor and storing instructions that, based on being executed by the at least one processor, perform operations. The operations may include receiving configuration information related to repeat transmission in N (N is a natural number) resource unit (RU) of the uplink channel; receiving downlink control information (DCI); and transmitting the uplink channel based on the configuration information. Based on configured mapping method, the N RUs may be mapped to K spatial relation reference signals, the uplink channel may be transmitted based on the K spatial relation reference signals, based on a downlink channel being scheduled in a k-th (0≤k≤N−1, k is a natural number) RU among the N RUs by the DCI, the uplink channel may be transmitted in the N RUs except for the k-th RU, and the configured mapping method may be maintained to map the K spatial relation reference signals to the n-th (k+1≤n≤N−1) RU.

Preferably, the K spatial relation reference signals may be sequentially and circularly mapped in an ascending order of an index of each RU of the N RUs.

Preferably, the N RUs may be grouped into K RU groups, the K spatial relation reference signals may be sequentially mapped in an ascending order of an index of the RU group.

Preferably, the N RUs may be grouped into a plurality of RU groups in M (M≤N, M is a natural number) RU units, for each RU group, the K spatial relation reference signals may be sequentially and circularly mapped in an ascending order of an index of the RU group.

Preferably, the N RUs may include only valid uplink transmission RUs, the valid uplink transmission RU may correspond to an RU determined to be capable of transmitting an uplink channel based on a configuration by higher layer signaling.

Preferably, the N RUs may include only valid uplink transmission RUs, the valid uplink transmission RU may correspond to an RU capable of actually transmitting an uplink channel.

Advantageous Effects

According to an embodiment of the present disclosure, even if some dropping occurs during repeated transmission of an uplink channel of a terminal, ambiguity of a mapping relationship with a spatial relation reference signal can be resolved.

In addition, according to an embodiment of the present disclosure, even if some dropping occurs during repeated transmission of an uplink channel of a terminal, by evenly applying a spatial relation reference signal to each resource for repeated transmission, a spatial diversity gain can be maximized.

In addition, according to an embodiment of the present disclosure, even if some dropping occurs during repeated transmission of an uplink channel of a terminal, an intended spatial relation reference signal can be applied without omission.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
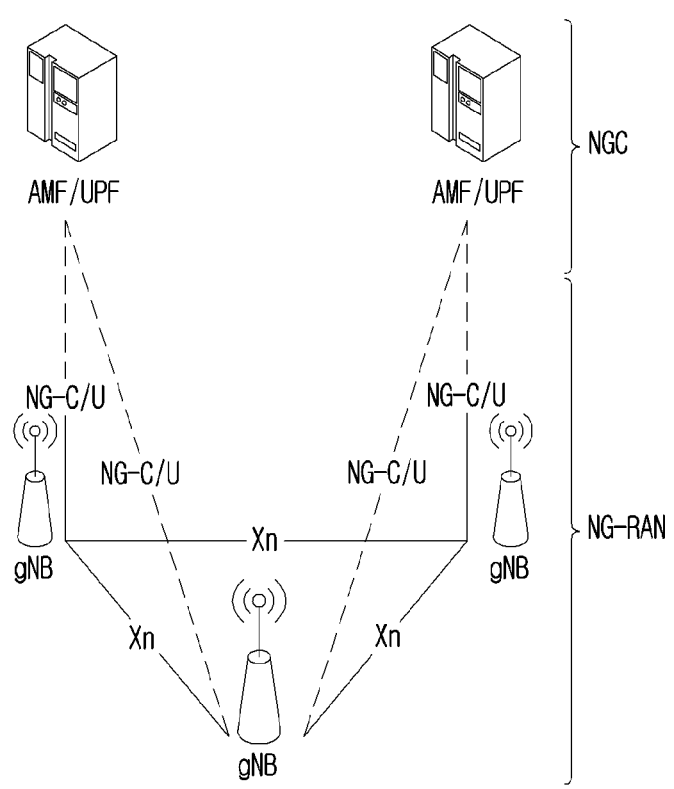
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
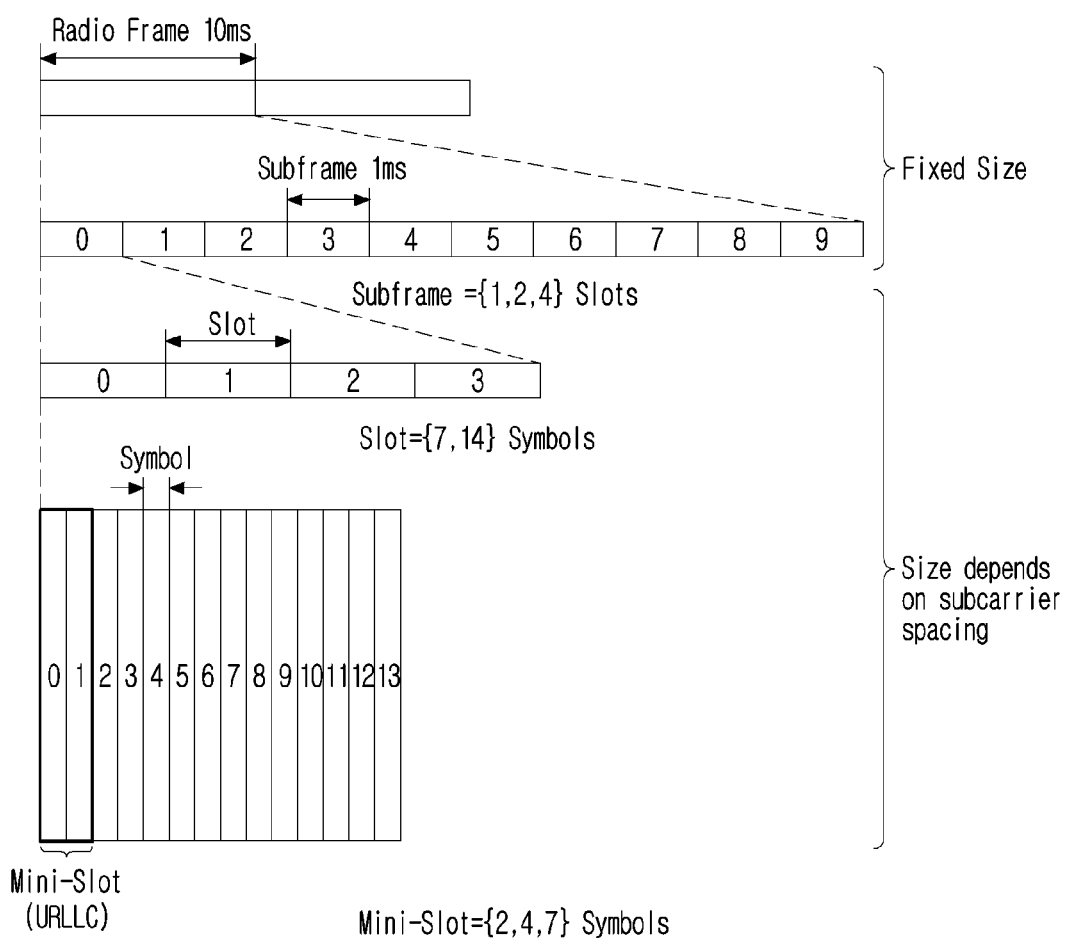
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
| --- | --- | --- |
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
| --- | --- | --- |
| FR1 | 410 MHz–7125 MHz | 15, 30, 60 kHz |
| FR2 | 24250 MHz–52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f = 1/(\Delta f_{max} N_f/100) \cdot T_c = 10$ ms. Here, a radio frame is configured with 10 subframes having a duration of $T_{sf} = (\Delta f_{max} N_f/1000) \cdot T_c = 1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
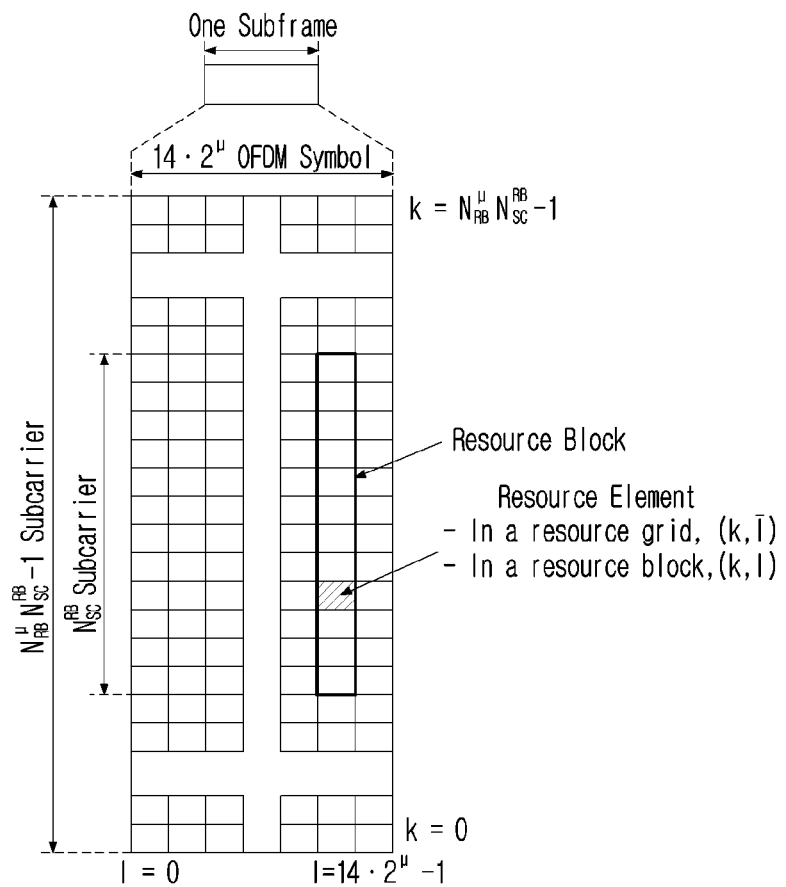
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu R_{sc}^{RB}$ subcarriers in a frequency domain and one subframe is configured with 14·2^μ OFDM symbols, but it is not limited thereto. In an NR system, a transmitted signal is described by OFDM symbols of $2^\mu N_{symb}^{(\mu)}$ and one or more resource grids configured with $N_{RB}^\mu R_{sc}^{RB}$ subcarriers. Here, $N_{RB}^\mu \le N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RB}^\mu N_{sc}^{RB}-1$ is an index in a frequency domain and l'=0, . . . , $2^\mu N_{symb}^{(\mu)}-1$ refers to a position of a symbol in a subframe. When referring to a resource element in a slot, an index pair (k,l) is used. Here, l=0, . . . , $N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^\mu$ and a resource element (k,l) for a subcarrier spacing configuration μ in a frequency domain is given as in the following Equation 1.

$$n_{CRB}^\mu = \left\lfloor \frac{k}{N_{SC}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^\mu = n_{PRB}^\mu + N_{BWP,i}^{start,\mu} \qquad \text{[Equation 2]}$$

$N_{BWP,i}^{start,\mu}$ is a common resource block that a BWP starts relatively to common resource block 0.

Figure 4:
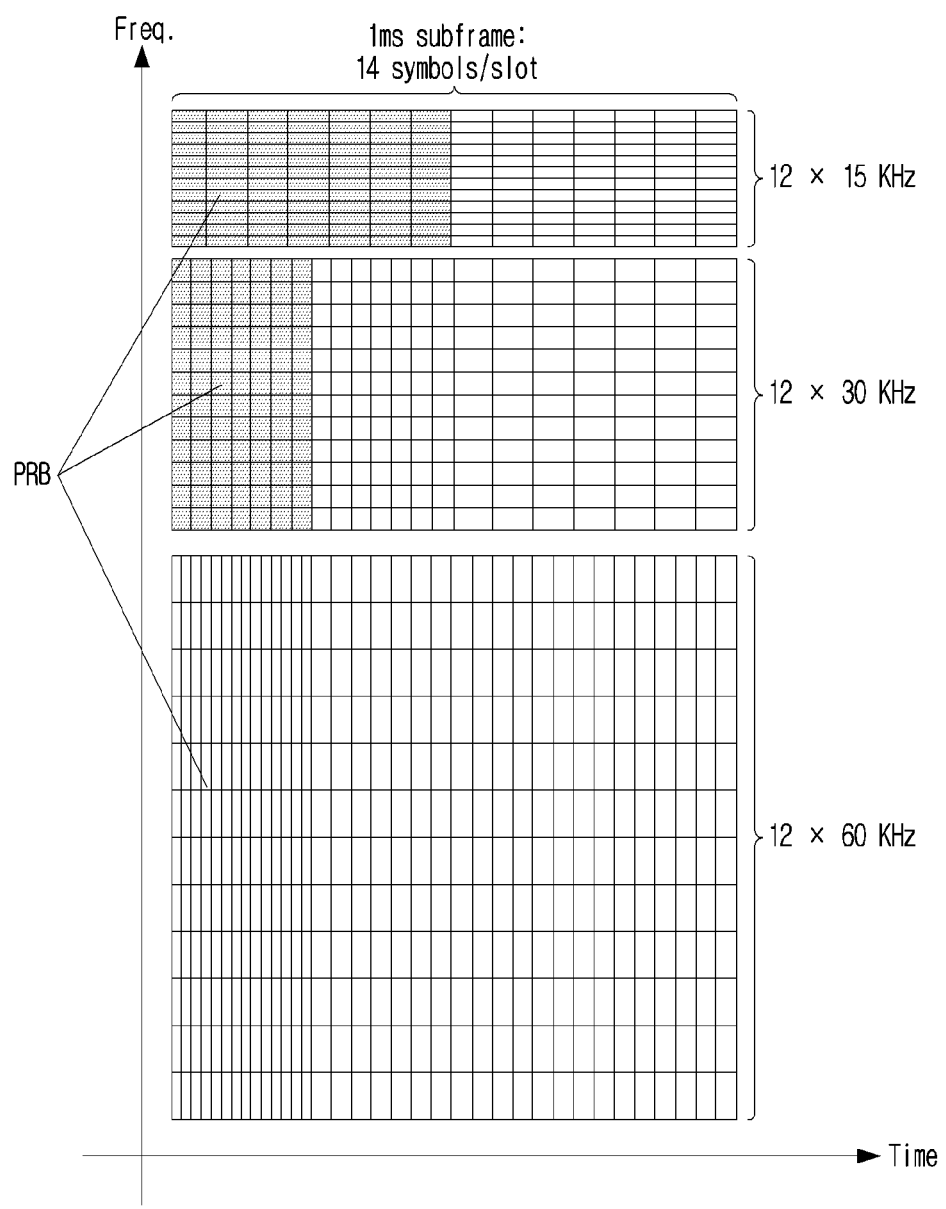
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
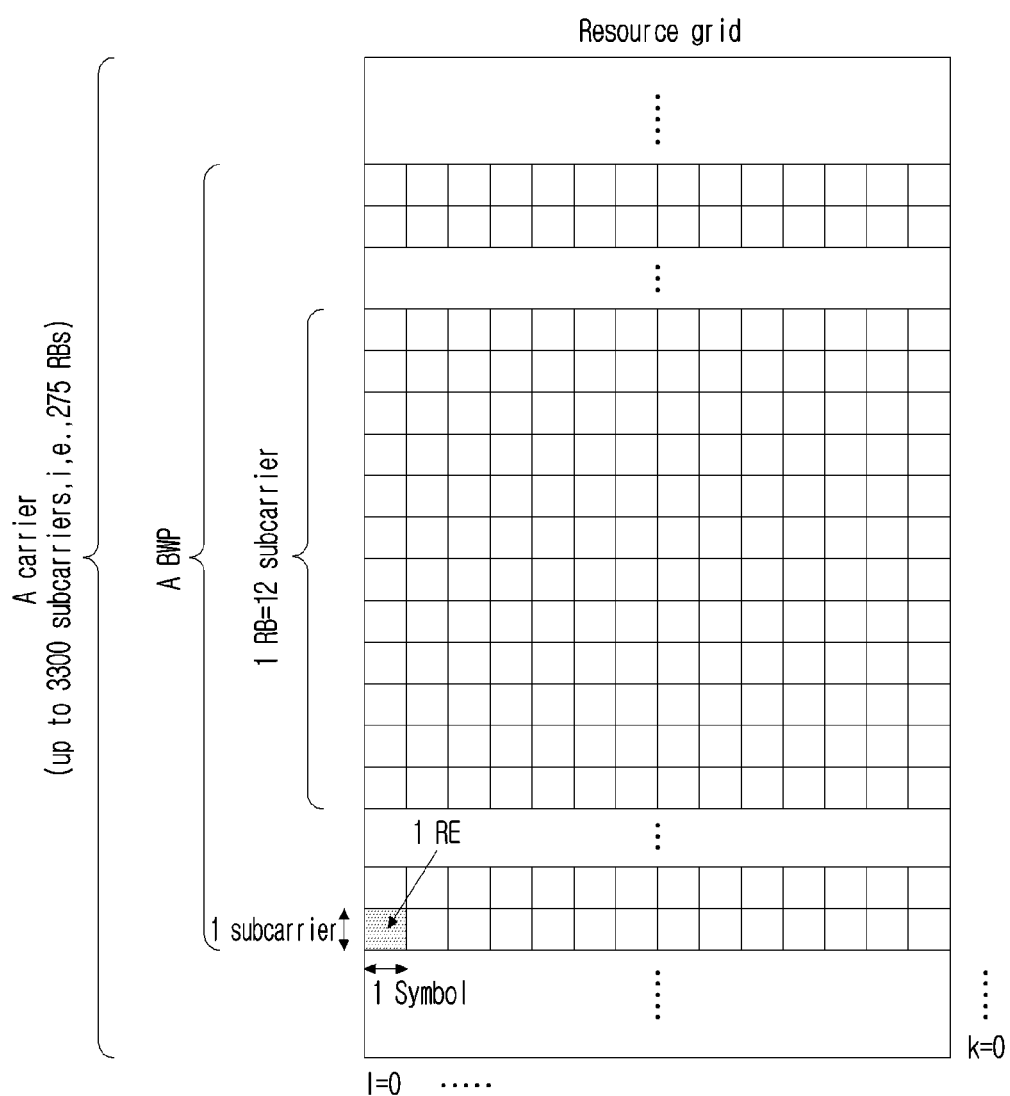
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
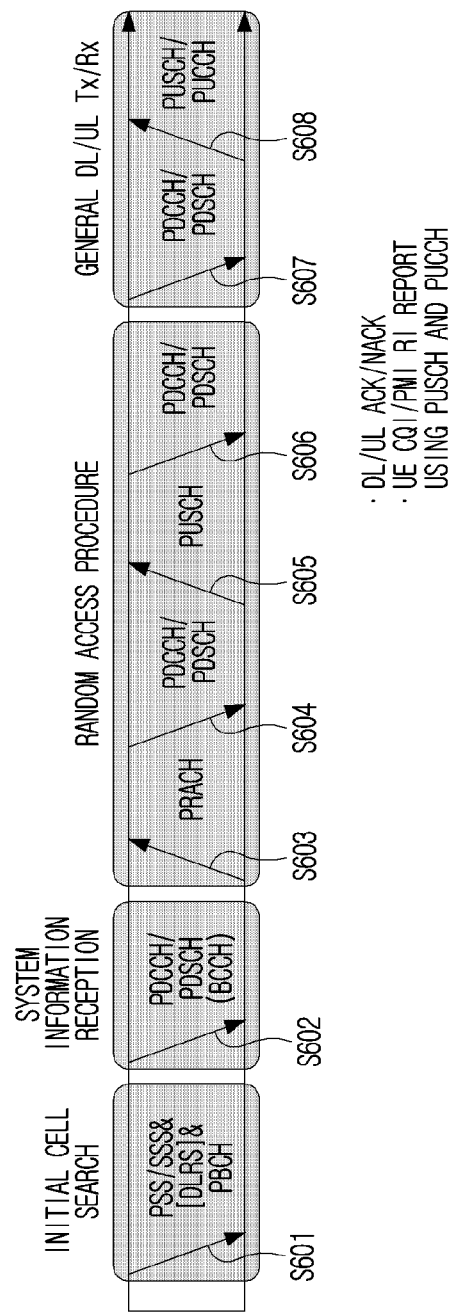
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Slot Aggregation

In Release (Rel)-15 NR, a method of improving reliability has been standardized by repeatedly transmitting one TB (transport block) to a plurality of contiguous slots as one layer for transmission of a PDSCH (Physical downlink shared channel) and a PUSCH (Physical uplink shared channel), a physical channel which may transmit data and control information. Here, the number of repetitions for downlink data (e.g., a higher layer parameter, aggregationFactorDL) and the number of repetitions for uplink data (e.g., a higher layer parameter, aggregationFactorUL) may have one value of {2,4,8}, respectively. In other words, the same data may be transmitted from contiguous 2 slots, 4 slots or 8 slots.

When UE is configured as aggregationFactorDL>1, the same symbol allocation is applied across aggregationFactorDL contiguous slots. UE expects that a TB is repeated within each symbol allocation in each slot of aggregationFactorDL contiguous slots and a PDSCH is limited to a single transmission layer. A redundancy version applied to a n-th transmission occasion of a TB is determined according to the following Table 6.

Table 6 illustrates a redundancy version applied in case of aggregationFactorDL>1.

TABLE 6

| rvid indicated by DCI scheduling a PDSCH | rvid applied to a n-th transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

When UE is configured as aggregationFactorUL>1, the same symbol allocation is applied across aggregationFactorUL contiguous slots and a PUSCH is limited to a single transmission layer. UE repeats a TB across aggregationFactorUL contiguous slots while applying the same symbol allocation to each slot. A redundancy version applied to a n-th transmission occasion of a TB is determined according to the following Table 7.

Table 7 illustrates a redundancy version applied in case of aggregationFactorUL>1.

TABLE 7

| rvid indicated by DCI scheduling a PUSCH | rvid applied to a n-th transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

In addition, in NR, the same UCI may be repeatedly transmitted across a plurality of contiguous slots (that available UL resources exist) even for a PUCCH (physical uplink control channel), a channel which transmits UCI (uplink control information).

As described above, a multi-slot PUSCH that repeat transmission for a TB is performed and a multi-slot PUCCH that repeat transmission for UCI is performed may be configured/indicated. In this case, a collision (transmission is indicated in the same symbol/slot) between the PUSCH/PUCCH resource and other PUCCH resource or PUSCH resource may occur in repeat transmission for contiguous slots that an available UL resource exists. In this case, an operation is defined that the TB/UCI is not transmitted from a corresponding slot or the TB/UCI is transmitted by being piggybacked (or multiplexed) to a resource that a collision occurred.

A PUCCH repetition procedure is described.

For PUCCH format 1, 3, or 4, UE may configure the number of slots ($N_{PUCCH}^{repeat}$) for PUCCH transmission through a higher layer parameter, nrofSlots.

For $N_{PUCCH}^{repeat}$>1,
i) UE repeats PUCCH transmission for UCI across $N_{PUCCH}^{repeat}$ slots.
ii) As provided by a higher layer parameter (nrofSymbols in PUCCH-format1, nrofSymbols in PUCCH-format3, or nrofSymbols in PUCCH-format4), PUCCH transmission has the same number of contiguous symbols in each of $N_{PUCCH}^{repeat}$ slots.

iii) As provided by a higher layer parameter (startingSymbolIndex in PUCCH-format1, startingSymbolIndex in PUCCH-format3, or startingSymbolIndex in PUCCH-format4), PUCCH transmission has the same first symbol in each of $N_{PUCCH}^{repeat}$ slots.

iv) UE configures whether frequency hopping for PUCCH transmission will be performed in different slots by a higher layer parameter, interslotFrequencyHopping.

iv-1) When UE is configured to perform frequency hopping for PUCCH transmission across different slots, UE performs frequency hopping per slot.

And, UE transmits a PUCCH starting from a first PRB provided by a higher layer parameter startingPRB in an even-numbered slot and transmits a PUCCH starting from a second PRB provided by a higher layer parameter secondHopPRB in an odd-numbered slot. A slot indicated for first PUCCH transmission of UE has number 0 and each subsequent slot is counted regardless of whether UE transmits a PUCCH in a corresponding slot until UE transmits a PUCCH in $N_{PUCCH}^{repeat}$ slots.

And, UE does not expect that it is configured to perform frequency hopping for PUCCH transmission in one slot.

iv-2) When UE is not configured to perform frequency hopping for PUCCH transmission across different slots and when UE is configured to perform frequency hopping for PUCCH transmission in one slot, a frequency hopping pattern between the first PRB and the second PRB is applied equally in each slot.

When UE determines for PUCCH transmission in one slot that the number of available symbols for PUCCH transmission is smaller than a value provided by a higher layer parameter nrofSymbols for a corresponding PUCCH format, UE does not transmit a PUCCH in the slot.

When UE is provided with a higher layer parameter TDD-UL-DL-ConfigurationCommon, or when UE is additionally provided with a higher layer parameter TDD-UL-DL-ConfigDedicated, UE determines $N_{PUCCH}^{repeat}$ slots for PUCCH transmission having the following symbol starting from one slot indicated to UE.

As a first symbol, an UL symbol or a flexible symbol provided by a higher layer parameter startingSymbolIndex in PUCCH-format1, PUCCH-format3, or PUCCH-format4, and Starting from a first symbol, contiguous UL symbols or flexible symbols equal to or greater than the number of symbols provided by a higher layer parameter nrofsymbols in PUCCH-format1, or PUCCH-format3, or PUCCH-format4

When UE is not provided with a higher layer parameter TDD-UL-DL-ConfigurationCommon, UE determines $N_{PUCCH}^{repeat}$ symbols for PUCCH transmission with $N_{PUCCH}^{repeat}$ contiguous slots starting from one slot indicated to UE.

When UE transmits a PUCCH across the first number of slots that $N_{PUCCH}^{repeat}$ is greater than 1, and when UE transmits a PUSCH across the first number of slots, and when PUCCH transmission is overlapped with PUSCH transmission in one or more slots, and when conditions for UCI multiplexing in a PUSCH are satisfied in overlapped slots, UE transmits a PUCCH and does not transmit a PUSCH in overlapped slots.

UE does not multiplex a different UCI type in PUCCH transmission which is repeated across $N_{PUCCH}^{repeat} > 1$ slots.

When UE transmits a first PUCCH across the first number of slots that $N_{PUCCH}^{repeat,1}$ is greater than 1, and when UE transmits a second PUCCH across the second number of slots that $N_{PUCCH}^{repeat,2}$ is greater than 1, and when first PUCCH transmission and second PUCCH transmission are overlapped in the third number of slots, for the third number of slots, in UCI type priority of HARQ-ACK>SR>CSI in high priority>CSI in low priority, UE does not expect that a first PUCCH and a second PUCCH start from the same slot and in addition, include a UCI type having the same priority.

When a first PUCCH and a second PUCCH include a UCI type having the same priority, UE transmits a PUCCH starting from an earlier slot and does not transmit a PUCCH starting from a later slot.

When a first PUCCH and a second PUCCH do not include a UCI type having the same priority, UE transmits a PUCCH including a UCI type having a higher priority and does not transmit a PUCCH including a UCI type having a lower priority.

When UE transmits a PUCCH across $N_{PUCCH}^{repeat}$ slots, and when UE does not transmit a PUCCH in one slot from $N_{PUCCH}^{repeat}$ slots due to overlapping with other PUCCH transmission in the slot, UE counts corresponding slots in the number of $N_{PUCCH}^{repeat}$ slots.

Embodiment I

In support of URLLC (ultra reliable low latency communication) service, regarding a wireless channel state, particularly, securing reliability is an important issue. A requirement for a wireless section on reliability makes a definition that a probability of transmitting a packet of y bytes in x msec should be generally equal to or greater than z %. (e.g., x=1, y=100, z=99.999) The most difficult thing to satisfy such a requirement is that as wireless channel quality itself deteriorates seriously, capacity of a corresponding channel may not satisfy the condition in principle. In this environment, the present disclosure tries to solve the issue by obtaining cell/base station diversity. In other words, as a plurality of cells/base stations/RPs (reception point) receive the same data, a terminal may transmit information to a different cell/base station/RP with a relatively good channel state although a wireless channel for a specific cell/base station/RP deteriorates seriously, and satisfies a requirement for reliability through it.

A technique proposed in the present disclosure is as follows.

Proposal (cell Cycling Uplink Transmission): In uplink transmission, a terminal alternately transmits data to a plurality of cells/base stations/RPs in promised order. In the contiguous transmission, uplink scheduling information (uplink grant) is signaled to a terminal only one time.

When applying this technique, a variety of methods may be considered in configuring a signal which will be transmitted per each cell/base station/RP. In the simplest way, a method of repeatedly transmitting the same signal to each cell/base station/RP may be considered. In other words, a signal to which the same channel coding is applied from the same information bit may be repeatedly transmitted to each cell/base station/RP sequentially. Alternatively, after coding at a lower coding rate in proportion to the number of cells/base stations/RPs participating from one information bit, encoded bits may be divided and transmitted to each cell/base station/RP. A summary of these methods is as follows.

Method 1 (Extended Channel Coding): Channel coding is applied so that a different parity bit of an encoded codeword can be transmitted to a different cell/base station/RP and decoded in one decoder.

Information bit repeat channel coding is a technique that an information bit in a TB (transport block) which will be transmitted to a different cell/base station/RP is configured equally and a parity bit is configured differently. A parity bit of a different cell/base station/RP may not be overlapped by predesignating a parity bit which will be used in encoding. (it is similar if a TB which will be transmitted to each cell/base station/RP is considered as retransmission of IR-HARQ (Incremental Redundancy HybridARQ)) In an example, when there are N cells/base stations/RPs, a parity bit generated in encoding is divided into N groups and only a parity bit in a group is used in a signal which will be transmitted to each cell/base station/RP. A device which received a corresponding signal knows parity group information transmitted to each cell/base station/RP and may perform decoding by arranging parity bits in a TB received from each cell/base station/RP by group.

Information bit non-repeat channel coding is a method that TBs which will be transmitted to a different cell/base station/RP are bound to make one group TB and channel coding is performed according to a group TB size. A corresponding technique has an advantage of having the largest channel coding gain and a disadvantage that decoding is possible only when all TB s are received from each cell/base station/RP.

Method 2 (Individual Channel Coding)

A repetition-based (LLR ratio) combining technique is a technique that a TB in the same size is applied to a different cell/base station/RP and the same TB is repeatedly transmitted. A device which received a corresponding signal gains a LLR (log likelihood ratio) value by independently performing a process before decoding. Calculated LLR values may be combined and utilized as an input value of one decoder.

Hard Value Combining is a technique that a TB in the same size is applied to a different cell/base station/RP and the same TB is repeatedly transmitted. In addition, a TB received in a different cell/base station/RP is independently decoded and when at least one TB of each cell/base station/RP succeeds in decoding, reception of a signal is determined as a success.

Proposal I-1 (Cross Cell Scheduling): A network schedules scheduling information on a plurality of contiguous subframes in a first subframe only one time and a terminal performs uplink transmission in the plurality of contiguous subframes to a plurality of cells/base stations/RPs.

In applying proposal I-1, information on whether of uplink scheduling for a plurality of contiguous subframes may be signaled in advance by a layer 2/3 message or may be transmitted to a terminal by a layer 1 message with uplink scheduling information. Alternatively, when a terminal may know in advance that URLLC information will be transmitted, this information may be omitted. Alternatively, when a terminal asks a base station for scheduling, a terminal may transmit it with uplink scheduling request information.

In applying proposal I-1, a terminal may not perform an action (e.g., blind decoding) for finding an UL grant during contiguous N subframes subsequent after receiving an UL grant in a specific subframe.

Figure 7:
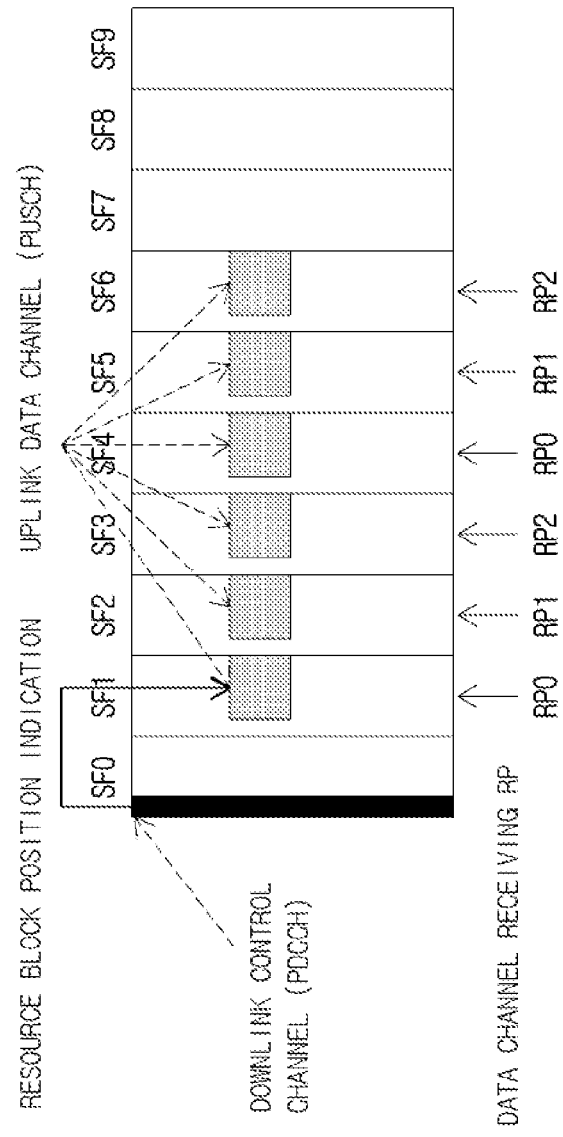
FIGS. 7 and 8 represent an example on repeat transmission of an uplink channel according to an embodiment of the present disclosure.
Figure 8:
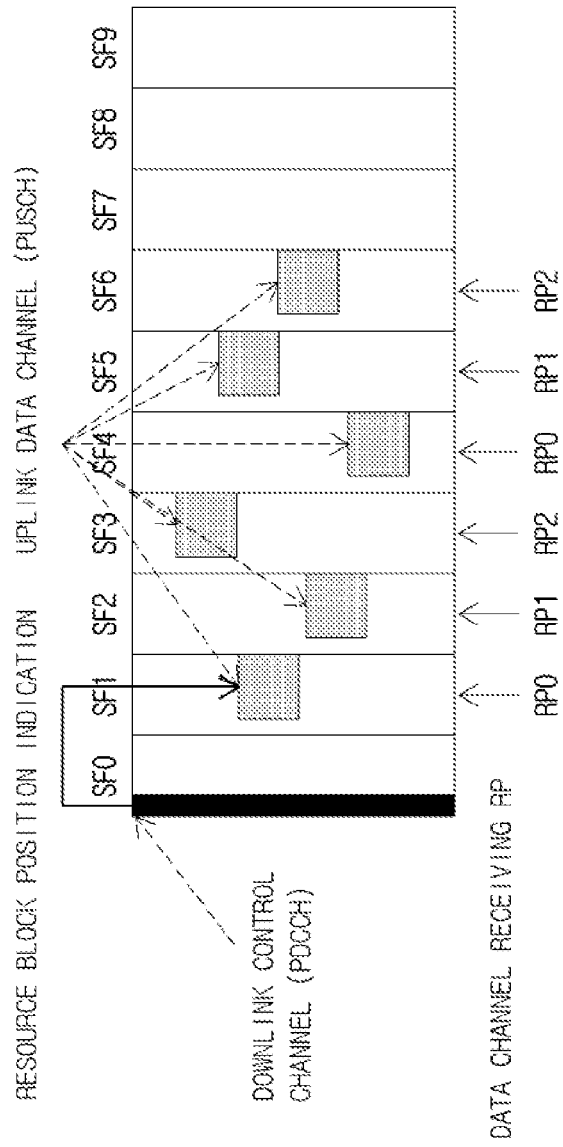

FIGS. 7 and 8 represent an example on repeat transmission of an uplink channel according to an embodiment of the present disclosure.

FIG. 7 represents an example in which a resource scheduled in a first subframe lasts during a plurality of contiguous subframes and FIG. 8 represents an example in which a resource scheduled in a first subframe hops according to a determined rule during a plurality of contiguous subframes.

When resource hopping is performed, there may be an advantage of having more frequency diversity gains in a situation when channel quality for multiple cells is not fully measured. When supporting both a case in which resource hopping is performed and a case in which resource hopping is not performed, signaling for whether hopping is performed may be indicated to a terminal as physical layer or layer 2/3 information. In these embodiments, a TDD (Time Division Duplexing) form is assumed, but even for FDD (Frequency Division Duplexing), a downlink control channel (DL control channel) and an uplink data channel (UL data channel) may be allocated to a different frequency band and applied equally.

In the proposal I-1, a basic unit switching transmission to calls/base stations/RPs is assumed as a subframe, but it is not limited. In an example, a method of switching transmission in a unit of a plurality of symbol groups is possible.

Figure 9:
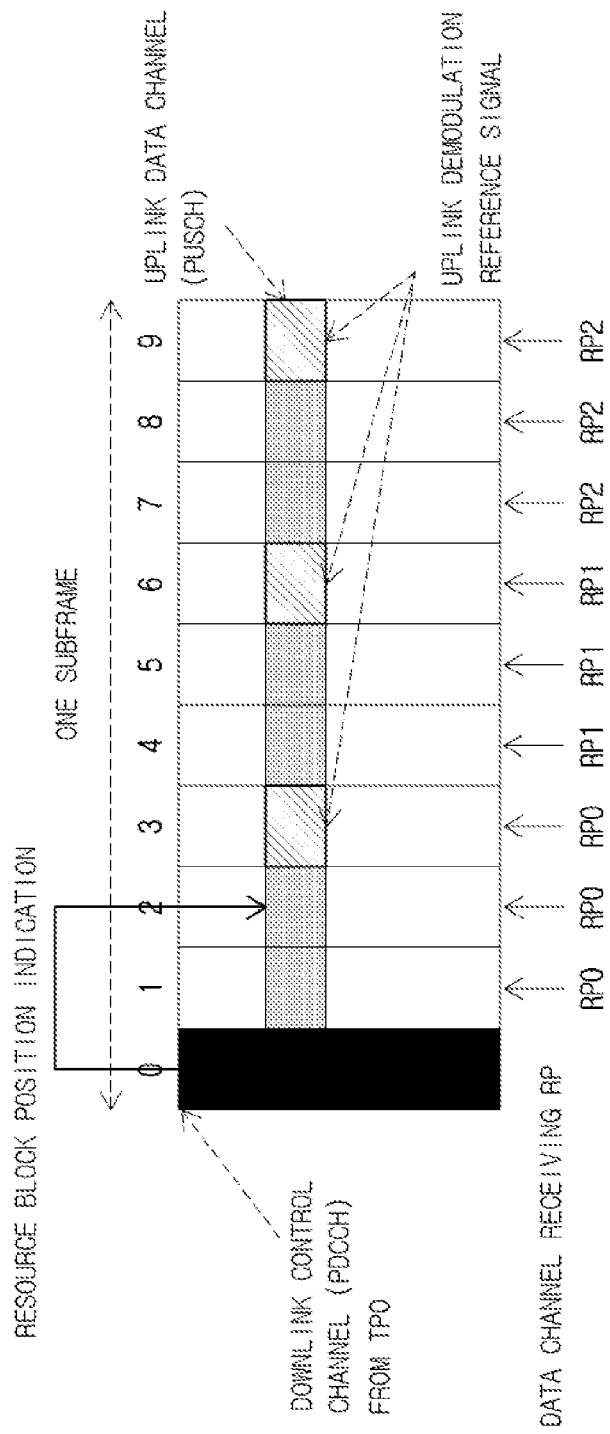
FIG. 9 represents an example on repeat transmission of an uplink channel according to an embodiment of the present disclosure.

FIG. 9 represents an example on repeat transmission of an uplink channel according to an embodiment of the present disclosure.

FIG. 9 represents a method in which 3 symbols are grouped individually and alternately received by a plurality of RPs. This embodiment assumes a configuration in a form that both a DL and UL symbol exist in one subframe.

In this specification, for convenience of a description, a unit time (e.g., a subframe, N symbols) that each cell/base station/RP alternately performs transmission per the base station is referred to as a time unit (TU).

Proposal I-2 (UL Demodulation Reference Signal): A terminal transmits at least one or more uplink demodulation reference signals per TU.

This proposal is necessary because a cell/a base station/a RP which will be received per TU is different.

Proposal I-3 (DL Control Signaling for indicating a Sequence of a RP): A network signals one or more of the following information to a terminal for a plurality of cells/base stations/RPs which will participate in uplink data reception.
  i) Cell/Base station/RP ID (identifier) information which will receive each TU
  ii) Physical resource position and/or sequence information of a reference signal which will be used in a cell/a base station/a RP which will receive each TU As a reference signal transmitted to each TU is received in a different cell/RP, a physical resource position (time/frequency) and/or sequence corresponding to a different cell/RP ID may be used. Accordingly, the information should be signaled so that a terminal will transmit reference signals. In an example, a participating cell/RP ID may be directly transmitted as in i). Alternatively, a scrambling ID of a reference signal may be transmitted as in ii) and in this case, a network notifies a terminal of scrambling ID set information of reference signals which are contiguously used as a layer 1 or layer 2/3 control message.

In applying the proposal, a stipulated cell/RP ID and a scrambling ID for a reference signal may be used for a cell/a RP (e.g., a serving cell) giving an UL grant in a first TU, so only information for subsequent reference signals may be signaled excluding information on a first TU.

Proposal I-4 (Timing Advance for Cell Cycling): A terminal which transmits a contiguous TU applies a different timing advance value per TU. In such a process, a symbol may be muted at a TU boundary point.

Example 1: When transmitting N contiguous TUs, a terminal may apply an independent timing advance value per TU after muting a last symbol of a first TU~a (N−1)-th TU or a first symbol of a second TU~a N-th TU.

Example 2: Only when a difference of a timing advance value satisfies a specific condition in Example 1, symbol muting may be performed. For example, only when a timing advance value of a subsequent TU is greater than a timing advance value of a previous TU, muting may be performed.

This proposal is proposed because uplink time synchronization may be different per TU when a terminal transmits a signal to a base station at a physically different distance.

The muting operation may be variously interpreted as transmission omission for a specific physical signal or channel or a puncturing operation for resource elements (RE) corresponding to a corresponding symbol for a specific physical channel or a rate matching operation.

Figure 10:
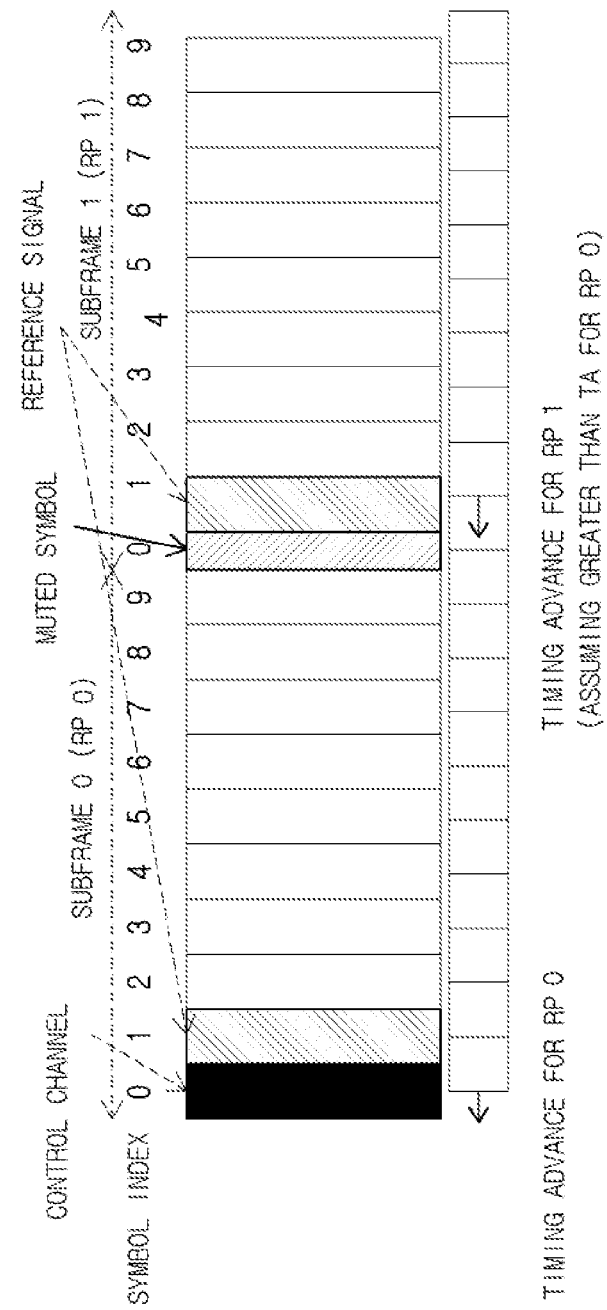
FIG. 10 illustrates a method in which timing advance is applied in uplink repeat transmission according to an embodiment of the present disclosure.

FIG. 10 illustrates a method in which timing advance is applied in uplink repeat transmission according to an embodiment of the present disclosure.

In FIG. 10, it is an embodiment that transmission for a first symbol of a TU is omitted. In this embodiment, it is an example that muting is performed because a first symbol of a second TU may not be transmitted as a timing advance (TA) value in a second TU is greater than a TA value in a first TU. If a TA value in a second TU is smaller than a TA value in a first TU, muting may not be performed as in the example 2.

Proposal I-5 (Uplink Synchronization):

Method 1: A network transmits a base station/cell/RP list with a possibility of performing contiguous transmission to a terminal as a layer ⅔ message. A terminal which received a corresponding message transmits an uplink signal (e.g., a PRACH, an UL reference signal) to each base station/cell/RP and receives in advance a configured value (e.g., a timing advance value) for matching uplink time synchronization in preparation for a case of performing contiguous transmission to base stations/cells/RPs included in a corresponding list.

Method 2: A plurality of base stations/cells/RPs receives a specific uplink signal of a terminal (e.g., a PRACH, an UL reference signal) to signal configured values (e.g., a timing advance value) for matching each uplink time synchronization to a terminal.

The method 1 is a method that after accessing a specific base station/cell/RP (e.g., a serving cell), a terminal transmits an uplink signal for each and receives a configured value to obtain an uplink synchronization configured value for additional base stations/cells/RPs in a corresponding base station/cell/RP.

Method 2 is a method that when a terminal transmits a specific uplink signal (e.g., a PRACH), a plurality of base stations/cells/RPs which will cyclically receive data receive a corresponding signal together to signal a plurality of uplink synchronization configured values through each or a representative base station/cell (e.g., a serving cell).

A technology of the present disclosure assumes transmission to a different base station/cell/RP which is physically separated, but it is not limited. A technology of the present disclosure may apply a method of the present disclosure by operating each frequency band as an independent logical cell when operating a plurality of frequency bands (carriers) in a base station implemented at the physically same position.

In other words, this technology may be extended to a technology which is cyclically transmitted to a different carrier in promised order to obtain a frequency diversity gain and similarly, may be also extended to a different carrier of a different base station/cell/RP. In addition, it may be also applied when receiving (a signal with the same data) by applying a plurality of different reception beams in the same base station/cell/RP.

Embodiment II

In the present disclosure, '/' means 'and' or 'or' in context. In the present disclosure, an idea is mainly described based on a PUSCH, but it is not limited thereto, and the same/a similar method may be applied to a PUCCH configured with a plurality of TUs (time unit). Hereinafter, the following proposal is described based on a case in which a PUSCH is transmitted by DCI for contiguous slots, but it may be also applied when a corresponding PUSCH is transmitted in a plurality of contiguous slots if PUSCH transmission is performed in contiguous slots at every specific period (e.g., a semi-persistent PUSCH) or if a PUSCH is transmitted in a corresponding resource (e.g., a grant-free PUSCH) when a terminal is necessary after an UL resource which available for PUSCH transmission (for URLLC or for voice service) is (semi-statically) granted to a terminal. The 'contiguous slots' may be contiguous slots only when a specific condition is satisfied. For example, in TDD, contiguous slots may be counted while excluding a DL slot (and a flexible slot that the number of UL symbols is equal to or less than a specific value).

In the proposal, it was proposed that one data packet configured in a specific unit (e.g., a transport block, a code block group) is repeatedly transmitted across multiple TUs (time unit), but each TU or TU group has a different reception source (e.g., a RP, a beam, a panel) to make a different reception source per TU group as well as combining diversity and time diversity caused by repeat transmission, so a TA value of a terminal may be changed per TU (group). Hereinafter, when a terminal performs beamforming for a transmission signal, a method of indicating/mapping a spatial relation for a terminal transmission beam in a TU (group) unit is proposed. Here, each transmission beam may be received in a different base station/TRP/panel/beam, but it is not limited. According to implementation of a base station, each transmission beam may be simultaneously received in a plurality of base stations/TRPs/panels/beams or a plurality of terminal transmission beams may be received as one wide reception beam. In particular, the present disclosure proposes a method or a rule for mapping a plurality of spatial relation RSs and TUs according to N, the total number of (contiguously) allocated TUs, and M, the total number of spatial relation RSs. For convenience of a description, hereinafter, in the present disclosure, it is assumed as TU=slot (group), but it is not limited, and it is obvious that a technology of the present disclosure may be also applied when a TU is configured at a symbol (group) level. In addition, in a current NR standard, a spatial relation RS for a SRS (sounding reference signal) or a PUSCH is defined to indicate one of a SRI (SRS resource indicator), a CRI (CSI-RS resource indicator), a SSBRI (SS/PBCH Resource Block Indicator) and a spatial relation RS for a PUSCH is defined to indicate SRI(s) (for codebook or non-codebook based UL transmission). Here, in Rel-15, for a codebook based UL, one SRI may be indicated in DCI format 0-1 and for a non-codebook based UL, as many SRI(s) as the number of transmission layers may be indicated in DCI format 0-1. For a codebook based UL in Rel-16, whether a plurality of SRI indications will be allowed for simultaneous transmission of a plurality of panels/beams is currently discussed. In the following description, a term of a spatial relation RS instead of a SRI is used to be applied to a PUCCH as well as a PUSCH and for convenience, a main example is based on codebook based UL. For non-codebook based UL transmission, 'one SRI' may be changed into 'as many SRIs as the number of layers' and applied in most of the following proposals.

When a technology of the present disclosure is applied, a representative information exchange and operation between a terminal and a base station is as follows.

Step 1) A base station configures/indicates spatial relation RS(s) information (i.e., transmission beam information) which will be applied per slot group and a slot group configuration for a multi-slot PUSCH to a terminal.

The information may be configured with a variety of detailed information and each detailed information may be transmitted to a terminal step by step through a different message. For example, multi-slot configuration and slot grouping information may be transmitted by a RRC message and spatial relation RS(s) information may be transmitted by MAC-CE or DCI.

A base station triggers (e.g., through DCI)/activates (e.g., through DCI or MAC CE) Multi-slot PUSCH transmission.

In this case, (part of) spatial relation RS(s) information which will be applied per slot group may be transmitted together.

If this technology is applied to a multi-slot PUCCH or a grant-free PUSCH, the triggering/activation process may be omitted.

Step 2) A terminal receives spatial relation RS(s) information (i.e., transmission beam information) which will be applied per slot group and a slot group configuration for a multi-slot PUSCH to a base station.

The information may be configured with a variety of detailed information and each detailed information may be transmitted to a terminal step by step through a different message. For example, multi-slot configuration and slot grouping information may be transmitted by a RRC message and spatial relation RS(s) information may be transmitted by MAC-CE or DCI.

A terminal receives a message for triggering (e.g., through DCI)/activating (e.g., through DCI or MAC CE) Multi-slot PUSCH transmission.

In this case, (part of) spatial relation RS(s) information which will be applied per slot group may be received together.

If this technology is applied to a multi-slot PUCCH or a grant-free PUSCH, the triggering/activation process may be omitted.

A terminal determines a PUSCH transmission beam (a spatial domain filter) which will be applied to a corresponding slot group from spatial relation RSs indicated/configured per each slot group of a Multi-slot PUSCH and uses it to transmit a PUSCH in a corresponding slot group.

A method of determining a PUSCH transmission beam (a spatial domain filter) which will be applied to a corresponding slot group from spatial relation RSs is as follows.

For example, when a Spatial relation RS is an UL RS (e.g., a SRS), a PUSCH transmission beam may be configured as a beam which transmitted a corresponding UL RS.

In addition, when a Spatial relation RS is a DL RS (e.g., a CSI-RS, a SSB), a PUSCH transmission beam may be configured as a transmission beam corresponding to a corresponding DL RS reception beam.

Here, for the 'transmission beam corresponding to a reception beam', the same spatial domain filter as a reception beam may be configured with transmission beams in general terminal implementation, but a (optimal) transmission beam corresponding to a (optimal) reception beam for a corresponding DL RS may be used after autonomously performing a corresponding relation between a transmission beam and a reception beam according to terminal implementation.

Step 3: A base station receives (may simultaneously receive each slot group in a plurality of TRPs/panels/beams) a PUSCH (and a DMRS) by using a TRP/a panel/a beam which received spatial relation RS(s) configured/indicated for a corresponding slot group or which is determined to be suitable for receiving corresponding spatial relation RS(s) per slot group configuring a Multi-slot PUSCH.

An operation in Step 3 may vary depending on implementation of a base station.

When the present disclosure is applied, a terminal may improve a communication success probability by (repeatedly) transmitting a signal (with the same information) through a different transmission beam per slot (group) to prevent link quality between a base station and a different transmission beam from greatly deteriorating although link quality between a base station and a specific transmission beam gets worse due to ray/beam blockage, UE rotation, UE mobility, etc.

Proposal II-1 (Operation of a Base Station): A base station which configured/indicated a N-slot PUSCH to a terminal may divide N slots into K slot groups to separately indicate spatial relation RS(s) which will be applied by a terminal per each slot group.

In the proposal II-1, a plurality of spatial relation RSs may be indicated per each slot group even for codebook based UL transmission (according to a terminal capability). For example, when a terminal is equipped with a plurality of transmission panels and may transmit one (or more) beam per each panel or when a terminal may simultaneously transmit a plurality of beams in a single panel, two or more transmission beams may be applied per each slot group. For example, when a base station indicates to a corresponding terminal spatial relation RSs={SRI #0,SRI #1} which will be applied in slot group #0 and spatial relation RSs={SRI #2,SRI #3} which will be applied in slot group #1, a terminal may use both a beam used when transmitting SRI #0 and a beam used when transmitting SRI #1 in slot group #0 and may use both a beam used when transmitting SRI #2 and a beam used when transmitting SRI #3 in slot group #1. Here, each of spatial relation RS(s) indicated for each slot group may be applied to a specific layer group or may be applied to all layers. As an example of transmission in a layer group unit, as in the example, if rank 4 transmission was indicated for spatial relation RSs={SRI #0,SRI #1} which will be applied in slot group #0 and layer group information was indicated like a first layer group={a first layer and a second layer} and a second layer group={a third layer and a fourth layer}, a terminal uses a beam used when transmitting SRI #0 to transmit a first layer group of a corresponding slot group and a beam used when transmitting SRI #1 to transmit a second layer group of a corresponding slot group. Alternatively, it may be applied to the same layer group. It corresponds to a case in which the same signal is simultaneously transmitted to a plurality of beams. In other words, if it is indicated as rank=4 as in the example, a terminal transmits all 4 layers by a beam used when transmitting SRI #1 (through a different panel/antenna group/RF chain) simultaneously with transmitting by a beam used when transmitting SRI #0 (through a specific panel/antenna group/ RF chain). A base station may configure whether which mode of the two transmission modes (transmission in a layer group unit, repeat transmission in all layers) will be applied to a terminal.

In CB (codebook) based UL transmission, single or a plurality of spatial relation RS(s) as described above may be indicated for one slot group and in this case, each spatial relation RS indicator (e.g., a SRI) may be indicated with a separate TPMI (transmit precoding matrix indicator) and TRI (transmit rank indicator). In other words, a terminal configures a (analogue) beam with spatial relation RS information indicated in PUSCH transmission in a corresponding slot group and forms a precoding matrix for corresponding PUSCH transmission with TRI information, TPMI mapped with a corresponding spatial relation RS. For CB based UL transmission, when a plurality of spatial relation RS information is indicated for the same slot group, a TPMI and a TRI are indicated respectively for each spatial relation RS (e.g., a TPMI and a TRI are indicated per each panel) or a TPMI is separately indicated per spatial relation RS, but a TRI is indicated as one common value (e.g., when 2 layers are repeatedly transmitted to each panel for indicated TRI=2, when each layer is transmitted in each panel for indicated TRI=2, two panel UE) and in this case, a stipulated value (e.g., TRI=1, i.e., 1 layer per each panel) may be used as a TRI value. Alternatively, one (master) TPMI/TRI may be indicated for a plurality of spatial relation RSs. For example, when 4 port SRI #0 and 4 port SRI #1 (for CB based UL transmission) are indicated as a spatial relation RS respectively in a specific slot group, one TPMI/TRI may be indicated based on 8 Txs by combining ports of two SRS resources. In other words, a TPMI here is a matrix index indicated by being selected from 8 port codebooks. Multi-slot transmission may be fixed as TRI=1 for URLLC and in this case, only TPMI(s) is indicated and a TPMI in this case is an index indicated by being selected from rank 1 codebook.

For Non-CB based UL, as many SRIs as the total number of layers which will be transmitted per each slot group may be indicated. Here, some of SRIs may be transmitted in the same (analogue) beam and others may be transmitted in other (analogue) beam, so a spatial relation RS of SRIs configuring SRIs may be different each other. For example, while indicating 4 SRIs for rank 4 transmission, a spatial relation may be CRI #0 for 2 SRIs and a spatial relation may be CRI #1 for the other two. In this case, a terminal would have transmitted first two SRIs to the same (analogue) beam (and a different digital beam or a differently precoded beam) and would have transmitted the remaining two SRIs to the same (analogue) beam (and a different digital beam or a differently precoded beam). Accordingly, first two layers and the remaining two layers of a PUSCH transmitted in a corresponding slot group may be transmitted respectively by a different beam. In another method, it may be indicated/configured to simultaneously transmit the same layer(s) by a plurality of beams (according to UE capability). It means that a plurality of spatial relation RSs (e.g., SRIs) are indicated particularly for the same layer(s) (or UL DMRS port(s)). In other words, if as many 1 port SRIs as the number of transmission ranks are indicated in the existing non-CB based transmission, in this case, as many X port SRIs as the number of transmission ranks may be indicated or as many SRIs as the number obtained by multiplying transmission ranks by X may be indicated. Here, X corresponds to the number of spatial relations or the number of beams performing simultaneous transmission. For the former, a plurality of ports included in one SRS resource are reference signals which may be simultaneously transmitted respectively by a different beam (through a different panel/antenna group/RF chain). In an example, a base station may indicate 8 SRIs to a terminal for rank 4 transmission and in this case, after mapping two SRIs to each layer (by a specific rule or a base station configuration), a terminal may simultaneously transmit using beams through which two mapped SRIs transmitted (through a different panel/antenna group/RF chain) when transmitting each layer.

When a SRS is configured, a SRS resource which may be simultaneously transmitted (by being transmitted from a different panel) and a SRS resource which may not be simultaneously transmitted (by being transmitted from the same panel) may be separately configured. For example, it may be said that RS resources (SRS resource) in the same SRS resource set may not be simultaneously transmitted and SRS resources belonging to a different SRS resource set may be simultaneously transmitted. In other words, physically, all SRS resources belonging to a SRS resource set are transmitted (by a different beam or the same beam) in the same transmission panel and when X SRS resource sets are configured, a terminal may transmit SRS resources by generating a beam in each of X transmission panels. In this case, when a plurality of SRIs are indicated per slot group, it is more desirable that each of SRIs indicated in the same slot group has a feature of belonging to a different SRS resource set. Here, SRIs indicated in a different slot group may be included in the same SRS resource set (because they are transmitted at a different time).

As in proposal II-1, if a base station wants a terminal to transmit with changing a transmission beam in a slot group unit for a multi-slot PUSCH, there is a disadvantage that spatial relation RS information to be indicated increases. Accordingly, hereinafter, methods of indicating spatial relation RS information to a terminal more effectively (e.g., minimizing an increase in a DCI payload size) are proposed.

Proposal II-1-1: Spatial relation RS set information which will be applied to K slot groups is defined as one spatial relation state. And, after configuring a plurality of spatial relation states to a terminal by a higher layer message (e.g., RRC), a base station may indicate one of the plurality of spatial relation states by a lower layer message (e.g., DCI or MAC-CE).

The lower layer message may be multi-slot PUSCH triggering DCI or semi-persistent multi-slot PUSCH activation DCI/MAC-CE.

Here, a size of a field indicating the spatial relation state in DCI may be determined by the number of spatial relation states configured by a higher layer message. For example, a value of n, the minimum natural number, is found among $2^n$ equal to or greater than the total number of spatial relation states and here, a corresponding field may be configured with n bit(s).

Hereinafter, embodiments on proposal II-1-1 are as follows.

Example 1) For K=4, two states may be configured by RRC like spatial relation state #0={SRI #0, SRI #1, SRI #2, SRI #3}, spatial relation state #1={SRI #0, SRI #1, SRI #0, SRI #1}. And, one state of two states may be indicated by 1-bit DCI. Here, a k-th element means a spatial relation RS which will be applied to a k-th slot group. k is 1,2,3,4. (The same spatial relation RS may be configured/indicated to multiple slot groups)

Example 2) When K is 2 and a terminal may simultaneously transmit two beams, two states may be configured by RRC like spatial relation state #0={SRI #0, SRI

1, SRI #2, SRI #3}, spatial relation state #1={SRI #0, SRI #1, SRI #0, SRI #1}. And, one state of two states may be indicated by 1-bit DCI. Here, first and second elements mean two spatial relation RSs which will be applied to a first slot group and third and fourth elements mean two spatial relation RSs which will be applied to a second slot group.

Example 3) It is assumed that K is 2, a terminal may simultaneously transmit X(=2) beams and two SRS resources which may not be simultaneously transmitted (because they are transmitted by a different beam in the same panel) are configured in one SRS resource set. In other words, it is assumed that SRS resource set #0 is {SRI #0, SRI #1}, SRS resource set #1 is {SRI #2, SRI #3}, resources in each set may not be simultaneously transmitted and SRS resources belonging to a different set may be simultaneously transmitted (because they are transmitted in a different panel). In this case, 4 states may be configured by RRC like spatial relation state #0={a first SRI in a SRS resource set, a second SRI in a SRS resource set}, spatial relation state #1={a second SRI in a SRS resource set, a first SRI in a SRS resource set}, spatial relation state #2={a first SRI in a SRS resource set, a first SRI in a SRS resource set}, spatial relation state #3={a second SRI in a SRS resource set, a second SRI in a SRS resource set}. And, X(=2) states may be indicated by X(=2)×2=4-bit DCI per each slot group. Here, a k-th element means a spatial relation RS which will be applied to a k-th slot group. k is 1,2. For example, when first spatial relation state=#0 and second spatial relation state=#3 are indicated by DCI, a PUSCH beam which will transmit a first slot group may be configured by using two beams which transmitted {a first SRI in SRS resource set #0, a second SRI in SRS resource set #1}, i.e., SRI #0 (transmitted in a first panel) and SRI #3 (transmitted in a second panel) in a first slot group. And, a PUSCH beam which will transmit a second slot group may be configured by using two beams which transmitted {a second SRI in SRS resource set #0, a second SRI in SRS resource set #1}, i.e., SRI #1 (transmitted in a first panel) and SRI #3 (transmitted in a second panel) in a second slot group.

Hereinafter, a method is proposed in which more effective signaling is performed by approaching in a direction different from the above-described proposal II-1-1.

Proposal II-1-2: Spatial relation RS(s) information which will be applied to each slog group may be separately indicated/configured.

Method 1) Spatial relation RS(s) for all slot groups may be preconfigured by a higher layer message (e.g., RRC and/or MAC-CE). And, a spatial relation RS(s) indication may be omitted for a multi-slot PUSCH scheduling triggering/activation message (e.g., DCI) or any (or specifically promised) spatial relation RS(s) (irrelevant to spatial relation RS(s) which will be actually applied) (e.g., SRI(s)) may be indicated.

Method 2) The remaining (K-D) spatial relation RS set(s) excluding D spatial relation RS set(s) which will be applied to specific slot group(s) among K spatial relation RS set(s) may be preconfigured/indicated by a higher layer message. And, spatial relation RS set(s) which will be applied to the specific slot group(s) may be indicated through multi-slot PUSCH scheduling DCI. (For example, D is 1)

Here, the 'spatial relation RS set' means a set of one or a plurality of spatial relation RSs applied to single slot PUSCH transmission. (For example, a single SRI for a CB-based UL PUSCH (a single panel) or R SRIs for a non-CB-based UL PUSCH (R transmission ranks for a PUSCH))

In the method, a default spatial relation value may be promised/stipulated that will be used when DCI format 0-0 is used or when a spatial relation RS set indication is omitted or a specifically promised spatial relation RS set value is indicated (e.g., SRI=0) for the scheduling DCI between a terminal and a base station for more effective signaling.

As an example of a default spatial relation, the same spatial relation as a PUCCH having the lowest ID and the same spatial domain filter used to transmit the most recent PRACH may correspond.

A slot group which is first transmitted or a slot group corresponding to the lowest slot group index among a plurality of slot groups configuring a corresponding PUSCH may be stipulated as an example of the specific slot group.

Method 3) all of K spatial relation RS set(s) may be indicated through multi-slot PUSCH scheduling DCI.

In the method, in order to reduce a DCI overhead, some of K spatial relation RS set(s) may be configured/stipulated to apply a default spatial relation proposed in Method 2. In this case, only the remaining spatial relation RS set(s) excluding slot group(s) to which a default spatial relation of K will be applied may be indicated by DCI.

In the method, in order to reduce a DCI overhead, a (compact) spatial relation RS list which will be used for a multi-slot PUSCH may be configured through higher layer signaling. And, a payload size of DCI for a spatial relation indication of each slot group may be configured/stipulated according to a size of the list.

A spatial relation RS list for the multi-slot PUSCH may be configured as a subset of a spatial relation RS list for a single slot PUSCH. For example, a total of 4 SRS resources are configured for codebook based UL, but when only 2 SRS resources of 4 are designated by the list, one SRI of 4 is designated by 2-bit information for a single slot PUSCH, but one SRI of 2 may be designated by 1-bit information per slot group for a multi-slot PUSCH. Similarly, even for non-CB based UL, a DCI payload may be reduced by a method of separately designating a candidate SRS resource list for a multi-slot PUSCH.

When applying the method, a spatial relation RS list which will be used may be separately configured according to the total number (N) of slots configuring a PUSCH or the number (K) of slot groups indicated by DCI.

For example, as K is larger, a list configured with fewer spatial relation RSs may be configured to reduce a DCI payload as much as possible by reducing the number of candidate spatial relation RSs per each slot group. (e.g., 8 SRIs for K=1 (3 bits), 4 SRIs for K=2 (2 bits), 2 SRIs for K=3 (1 bit))

The methods may be used together (or in combination). For example, when K or N is equal to or less than a specific value, Method 3 may be used and when K or N is equal to or greater than a specific value, Method 1 or 2 may be used after giving up dynamically indicating a spatial relation RS by DCI.

When the proposal II-1 is applied, a base station may illustratively perform the following signal/operation flow.

Step 1: A base station may configure/indicate spatial relation RS(s) information (i.e., transmission beam information) which will be applied per slot group and a slot group configuration for a multi-slot PUSCH.

The information may be configured with a variety of detailed information and each detailed information may be transmitted to a terminal step by step through a different message. For example, multi-slot configuration and slot grouping information may be transmitted by a RRC message and spatial relation RS(s) information may be transmitted by MAC-CE or DCI.

A base station triggers (e.g., through DCI)/activates (e.g., through DCI or MAC CE) Multi-slot PUSCH transmission.

In this case, (part of) spatial relation RS(s) information which will be applied per slot group may be transmitted together.

If this technology is applied to a multi-slot PUCCH or a grant-free PUSCH, the triggering/activation process may be omitted.

When the present disclosure is applied, a communication success probability may be improved by (repeatedly) transmitting a signal (with the same information) through a different transmission beam per slot (group) to prevent link quality between a (different or the same) base station and a different beam from greatly deteriorating although link quality between a base station and a specific beam gets worse due to ray/beam blockage, UE rotation, UE mobility, etc.

Hereinafter, a terminal operation when applying the proposals is proposed. Each method and embodiment in the proposal II-1 correspond to each method and embodiment in the following proposal II-2, respectively.

Proposal II-2: A terminal which is configured/indicated with a N-slot PUSCH from a base station may divide N slots into K slot groups to apply spatial relation RS(s) configured/indicated per each slot group.

In the proposal II-2, a plurality of spatial relation RSs may be indicated per each slot group even for codebook based UL transmission (according to a terminal capability). For example, when a terminal is equipped with a plurality of transmission panels and may transmit one (or more) beam per each panel or when a terminal may simultaneously transmit a plurality of beams in a single panel, it may be indicated to apply two or more transmission beams per each slot group. For Non-CB based UL, as many SRIs as the total number of layers which will be transmitted per each slot group may be indicated. Here, some of SRIs may be transmitted in the same (analogue) beam and others may be transmitted in other (analogue) beam, so a spatial relation RS of SRIs configuring SRIs may be different each other.

When a SRS is configured/indicated, a terminal may determine whether it will be transmitted in the same transmission antenna group/panel according to whether it is a SRS resource belonging to the same SRS resource set. For example, all SRS resources belonging to a SRS resource set are transmitted (by a different beam or the same beam) in the same transmission panel and when X SRS resource sets are configured, a terminal may transmit SRS resources by generating a beam in each of X transmission panels. In this case, when a plurality of SRIs are indicated per slot group, it is more desirable that each of SRIs indicated in the same slot group has a feature of belonging to a different SRS resource set. Here, SRIs indicated in a different slot group may be included in the same SRS resource set (because they are transmitted at a different time).

As in proposal II-1, if a base station wants a terminal to transmit with changing a transmission beam in a slot group unit for a multi-slot PUSCH, there is a disadvantage that spatial relation RS information to be indicated increases, so more effective indication methods are proposed as in proposal II-1-1/II-1-2. Hereinafter, when receiving signaling of a base station to which the proposal II-1-1/II-1-2 is applied, an operation of a terminal is proposed respectively.

Proposal II-2-1) After being configured with a plurality of spatial relation states by a higher layer message (e.g., RRC), a terminal may be indicated with one of the plurality of spatial relation states by a lower layer message (e.g., DCI or MAC-CE). In addition, a terminal allocated with a multi-slot PUSCH transmission resource (and indicated to transmit) divides multi-slots into K slot groups and determines/applies a spatial relation RS set which will be applied to K slot groups respectively according to information designated in the finally indicated spatial relation state to determine and transmit a beam (a spatial domain filter) which will transmit a corresponding slot group.

The lower layer message may be multi-slot PUSCH triggering DCI or semi-persistent multi-slot PUSCH activation DCI/MAC-CE.

In this case, a size of a field indicating the spatial relation state in DCI may be determined by the number of spatial relation states configured by a higher layer message. (For example, a value of n, the minimum natural number, is found among $2^n$ equal to or greater than the total number of states and here, a corresponding field may be configured with n bit(s).)

Embodiments of proposal II-2-1 are as follows.

Example 1) For K=4, two states may be configured by RRC like spatial relation state #0={SRI #0, SRI #1, SRI #2, SRI #3}, spatial relation state #1={SRI #0, SRI #1, SRI #0, SRI #1}. And, one state of two states may be indicated by 1-bit DCI. Here, a k-th element means a spatial relation RS which will be applied to a k-th slot group. k is 1,2,3,4. (The same spatial relation RS may be configured/indicated to multiple slot groups)

Example 2) When K is 2 and a terminal may simultaneously transmit two beams, two states may be configured by RRC like spatial relation state #0={SRI #0, SRI #1, SRI #2, SRI #3}, spatial relation state #1={SRI #0, SRI #1, SRI #0, SRI #1}. And, one state of two states may be indicated by 1-bit DCI. Here, first and second elements mean two spatial relation RSs which will be applied to a first slot group and third and fourth element mean two spatial relation RSs which will be applied to a second slot group.

Example 3) It is assumed that K is 2, a terminal may simultaneously transmit X(=2) beams and two SRS resources which may not be simultaneously transmitted (because they are transmitted by a different beam in the same panel) are configured in one SRS resource set.

In other words, it is assumed that a terminal configured with SRS resource set #0={SRI #0, SRI #1}, SRS resource set #1={SRI #2, SRI #3} assumes that SRI #0 and SRI #1 are transmitted by the same beam or a different beam in the same antenna group/panel/RF chain and SRI #2 and SRI #3 are similarly transmitted by the same beam or a different beam in the same antenna group/panel/RF chain. It is assumed that (SRI #0 or SRI #1) and (SRI #2 or SRI #3) are transmitted in a different same antenna group/panel/RF chain. In this case, 4 states may be configured by RRC like spatial relation state #0={a first SRI in a SRS resource set, a second SRI in a SRS resource set}, spatial relation state #1={a second SRI in a SRS resource set, a first SRI in a SRS resource set}, spatial relation state #2={a first SRI in a SRS resource set, a first SRI in a SRS resource set}, spatial relation state #3={a second SRI in a SRS resource set, a second SRI in a SRS resource set}. And, X(=2) states may be indicated by X(=2)×2=4-bit DCI per each slot group. Here, a k-th element means a spatial relation RS which will be applied to a k-th slot group. k is 1,2. For example, when first spatial relation state=#0 and second spatial relation state=#3 are indicated by DCI, a PUSCH beam which will transmit a first slot group may be configured by using two beams which transmitted {a first SRI in SRS resource set #0, a second SRI in SRS resource set #1}, i.e., SRI #0 (transmitted in a first panel) and SRI #3 (transmitted in a second panel) in a first slot group. And, a PUSCH beam which will transmit a second slot group may be configured by using two beams which transmitted {a second SRI in SRS resource set #0, a second SRI in SRS resource set #1}, i.e., SRI #1 (transmitted in a first panel) and SRI #3 (transmitted in a second panel) in a second slot group.

Proposal II-2-2: Spatial relation RS(s) information which will be applied to each slot group may be separately indicated/configured.

Method 1) Spatial relation RS(s) for all slot groups may be preconfigured by a higher layer message (e.g., RRC and/or MAC-CE). And, a spatial relation RS(s) indication may be expected to be omitted for a multi-slot PUSCH scheduling triggering/activation message (e.g., DCI) or spatial relation RS(s) (e.g., SRI(s)) indicated by the message may be ignored. In other words, for example, a SRI value indicated by DCI may be ignored and spatial relation RS(s) preconfigured by a higher layer message may be applied.

Method 2) The remaining (K-D) spatial relation RS set(s) excluding D spatial relation RS set(s) which will be applied to specific slot group(s) among K spatial relation RS set(s) may be preconfigured/indicated by a higher layer message. And, spatial relation RS set(s) which will be applied to the specific slot group(s) may be indicated by multi-slot PUSCH scheduling DCI. (For example, D is 1)

Here, the 'spatial relation RS set' means a set of one or a plurality of spatial relation RSs applied to single slot PUSCH transmission. (For example, a single SRI for a CB-based UL PUSCH (a single panel) or R SRIs for a non-CB-based UL PUSCH (R transmission ranks for a PUSCH))

In the method, a default spatial relation value may be promised/stipulated that will be used when DCI format 0-0 is used or when a spatial relation RS set indication is omitted or a specifically promised spatial relation RS set value is indicated (e.g., SRI=0) for the scheduling DCI between a terminal and a base station for more effective signaling.

As an example of a default spatial relation, the same spatial relation as a PUCCH having the lowest ID and the same spatial domain filter used to transmit the most recent PRACH may correspond.

A slot group which is first transmitted or a slot group corresponding to the lowest slot group index among a plurality of slot groups configuring a corresponding PUSCH may be stipulated as an example of the specific slot group.

Method 3) all of K spatial relation RS set(s) may be indicated through multi-slot PUSCH scheduling DCI.

In the method, some of K spatial relation RS set(s) may be configured/specified to apply a default spatial relation proposed in Method 2 to reduce a DCI overhead. In this case, only the remaining spatial relation RS set(s) excluding slot group(s) to which a default spatial relation of K will be applied may be indicated by DCI.

In the method, in order to reduce a DCI overhead, a (compact) spatial relation RS list which will be used for a multi-slot PUSCH may be configured through higher layer signaling. And, a payload size of DCI for a spatial relation indication of each slot group may be configured/specified according to a size of the list.

A spatial relation RS list for the multi-slot PUSCH may be configured as a subset of a spatial relation RS list for a single slot PUSCH. For example, a total of 4 SRS resources are configured for codebook based UL, but when only 2 SRS resources of 4 are designated by the list, one SRI of 4 is designated by 2-bit information for a single slot PUSCH, but one SRI of 2 may be designated by 1-bit information per slot group for a multi-slot PUSCH. Similarly, even for non-CB based UL, a DCI payload may be reduced by a method of separately designating a candidate SRS resource list for a multi-slot PUSCH.

When applying the method, a spatial relation RS list which will be used may be separately configured according to the total number (N) of slots configuring a PUSCH or the number (K) of slot groups indicated by DCI.

For example, as K is larger, a list configured with fewer spatial relation RS(s) may be configured. For example, 8 SRIs for K=1 (3 bits), 4 SRIs for K=2 (2 bits), 2 SRIs for K=3 (1 bit)

The methods may be used together (or in combination). For example, when K or N is equal to or less than a specific value, Method 3 may be used and when K or N is equal to or greater than a specific value, Method 1 or 2 may be used after giving up dynamically indicating a spatial relation RS by DCI.

When the proposal II-2 is applied, a terminal may illustratively perform the following signal/operation flow.

Step 2) A terminal receives spatial relation RS(s) information (i.e., transmission beam information) which will be applied per slot group and a slot group configuration for a multi-slot PUSCH to a base station.

The information may be configured with a variety of detailed information and each detailed information may be transmitted to a terminal step by step through a different message. For example, multi-slot configuration and slot grouping information may be transmitted by a RRC message and spatial relation RS(s) information may be transmitted by MAC-CE or DCI.

A terminal receives a message for triggering (e.g., through DCI)/activating (e.g., through DCI or MAC CE) Multi-slot PUSCH transmission.

In this case, (some of) spatial relation RS(s) information which will be applied per slot group may be received together.

If this technology is applied to a multi-slot PUCCH or a grant-free PUSCH, the triggering/activation process may be omitted.

A terminal determines a PUSCH transmission beam (a spatial domain filter) which will be applied to a corresponding slot group from spatial relation RSs indicated/configured per each slot group of a Multi-slot PUSCH and uses it to transmit a PUSCH in a corresponding slot group.

A method of determining a PUSCH transmission beam (a spatial domain filter) which will be applied to a corresponding slot group from spatial relation RSs is as follows.

For example, when a spatial relation RS is an UL RS (e.g., a SRS), a PUSCH transmission beam may be configured as a beam which transmitted a corresponding UL RS.

In addition, when a Spatial relation RS is a DL RS (e.g., a CSI-RS, a SSB), a PUSCH transmission beam may be configured as a transmission beam corresponding to a corresponding DL RS reception beam.

Here, for the 'transmission beam corresponding to a reception beam', the same spatial domain filter as a reception beam may be configured with transmission beams in general terminal implementation, but a (optimal) transmission beam corresponding to a (optimal) reception beam for a corresponding DL RS may be used after autonomously performing a corresponding relation between a transmission beam and a reception beam according to terminal implementation.

When the present disclosure is applied, a communication success probability may be improved by (repeatedly) transmitting a signal (with the same information) through a different transmission beam per slot (group) to prevent link quality between a (different or the same) base station and a different beam from greatly deteriorating although link quality between a base station and a specific beam gets worse due to ray/beam blockage rotation, UE mobility, etc.

In the proposal II-1/II-1-1/II-1-2/II-2/II-2-1/II-2-2, a method of indicating all spatial relation RS sets per slot group was proposed, but a method of indicating some slot groups by omitting a spatial relation RS set is also possible. As such, in a slot group that a spatial relation RS set indication is omitted, it may be stipulated to transmit i) a beam randomly selected by a terminal or ii) a surrounding beam of a beam indicated for other (or adjacent) slot group (e.g., a beam that a difference in an angle of departure is within a specific scope). As an embodiment, when a base station indicates a single spatial relation RS set for multi-slot PUSCH transmission, a terminal may find an optimum beam set for a spatial relation RS set indicated after being divided into K slot groups (by a specific rule or a base station configuration) and generate k (surrounding) beam sets randomly or by a specific rule based on a corresponding beam set to sequentially apply and transmit one beam set per each slot group. For the methods, a diversity effect may be maximized by stipulating that a beam is changed and applied for an adjacent slot (group) and extremely, if all spatial relation RS set indications are omitted for a multi-slot PUSCH, a terminal may apply any beam(s) per slot (group) while changing it.

Hereinafter, a method is proposed that N slots (or symbol groups) configuring a PUSCH/a PUCCH are mapped to K spatial relation RSs.

To maximize reliability, it is more desirable to configure a slot group as evenly as possible according to N, the total number of slots configuring a PUSCH (aggregationFactorUL), and K, the number of spatial relation RS sets. For example, on the assumption of N∈{2,4,8,16}, K∈{1,2,3,4}, N_k, the number of slots that a k-th slot group is included may be configured as follows.

Values in the after-mentioned table mean {N_1, ..., N_K} in a combination of a corresponding N value and K value. Finally, it is more desirable to configure so that a deviation of N_k values (k=1, ... K) will be as small as possible.

Table 8 illustrates a method of distributing the number of slots per slot group.

TABLE 8

|  | K = 1 | K = 2 | K = 3 | K = 4 |
| --- | --- | --- | --- | --- |
| N = 2 | {2} | {1, 1} | — | — |
| N = 4 | {4} | {2, 2} | {2, 1, 1} | {1, 1, 1, 1} |
| N = 8 | {8} | {4, 4} | {3, 3, 2} | {2, 2, 2, 2} |
| N = 16 | {16} | {8, 8} | {6, 5, 5} | {4, 4, 4, 4} |

A proposed technology of the present disclosure may be used by being extended for a purpose other than a purpose of improving reliability. In other words, multi-slot PUSCH transmission may be used for transmitting a different TB instead of repeatedly transmitting the same TB (transport block) in each slot.

In this case, a terminal may transmit a different TB by a different beam (by using a beam) per each slot group.

When considering even this purpose, application of a combination with a large deviation as well as a combination with a small deviation of N_k values (k=1, ... K) may be occasionally considered as proposed above. Accordingly, a base station may configure/indicate to a terminal a method of distributing the number of slots per slot group to be applied (and a method of mapping a spatial relation RS set per slot in a corresponding distribution method). In other words, a terminal may be configured/indicated with a method of distributing the number of slots per slot group to be applied (and a method of mapping a spatial relation RS set per slot in a corresponding distribution method) from a base station.

Based on the Table 8, a variety of methods may be used to perform slot grouping. When considering a hardware condition such as beam/panel switching delay, power transition time, etc., a terminal may maximize time diversity by frequently changing and transmitting a beam i) if a guard symbol (i.e., a muted symbol) between contiguous symbols that a beam is changed is not necessary, and/or ii) if timing advance (TA) which will be applied per each beam is the same (or a difference value is within a specific value), and/or iii) a power difference which will be applied per each beam is within a certain value (or a power transition time is within a certain time or the same power control is applied) although a terminal transmits a beam while switching it. In other words, a slot group transmitted by the same beam may be extended (spanned) to as wide a time domain as possible. An embodiment of this method is the same as in the following Table 9. Values in Table 9 mean {K_1, ..., K_N} in a combination of a corresponding N value and K value and K_n means an index of a spatial relation RS set which will be applied in a n-th slot. A proposal of Table 9 has a characteristic of sequentially mapping a spatial relation RS set index per each slot index. In this case, a spatial relation RS set index is cyclically mapped. This method is referred to as 'a full shuffling method' for convenience.

Table 9 illustrates a spatial relation RS set matting method per slot (a full shuffling mapping method).

TABLE 9

|  | K = 1 | K = 2 | K = 3 | K = 4 |
| --- | --- | --- | --- | --- |
| N = 2 | {1, 1} | {1, 2} | — | — |
| N = 4 | {1, 1, 1, 1} | {1, 2, 1, 2} | {1, 2, 3, 1} | {1, 2, 3, 4} |
| N = 8 | {1, 1, 1, 1, 1, 1, 1, 1} | {1, 2, 1, 2, 1, 2, 1, 2} | {1, 2, 3, 1, 2, 3, 1, 2} | {1, 2, 3, 4, 1, 2, 3, 4} |
| N = 16 | {1, 1, 1, 1, 1, 1, 1, 1, 1, 1, 1, 1, 1, 1, 1, 1} | {1, 2, 1, 2, 1, 2, 1, 2, 1, 2, 1, 2, 1, 2, 1, 2} | {1, 2, 3, 1, 2, 3, 1, 2, 3, 1, 2, 3, 1, 2, 3, 1} | {1, 2, 3, 4, 1, 2, 3, 4, 1, 2, 3, 4, 1, 2, 3, 4} |

Meanwhile, if a burden that guard time is necessary or that more power consumption occurs is generated when a terminal changes a beam due to the above-described various hardware conditions (subordinate to UE capability) and/or TA conditions and/or power control related conditions, it is more desirable to minimize the number of beam changes as in a proposal of the following Table 10. A method in the following Table 10 makes a feature of minimizing the number of spatial relation RS changes by mapping a k-th slot group to N_k contiguous slots. This method is referred to as 'a sequential mapping method' for convenience.

Table 10 illustrates a spatial relation RS set mapping method per slot (a sequential mapping method).

TABLE 10

|  | K = 1 | K = 2 | K = 3 | K = 4 |
|---|---|---|---|---|
| N = 2 | {1, 1} | {1, 2} | — | — |
| N = 4 | {1, 1, 1, 1} | {1, 1, 2, 2} | {1, 1, 2, 3} | {1, 2, 3, 4} |
| N = 8 | {1, 1, 1, 1, 1, 1, 1, 1} | {1, 1, 1, 1, 2, 2, 2, 2} | {1.1, 1.2, 2.2, 3.3} | {1, 1, 2, 2, 3, 3, 4, 4} |
| N = 16 | {1, 1, 1, 1, 1, 1, 1, 1, 1, 1, 1, 1, 1, 1, 1, 1} | {1, 1, 1, 1, 1, 1, 1, 1, 2, 2, 2, 2, 2, 2, 2, 2} | {1, 1, 1, 1, 1, 1, 2, 2, 2, 2, 2, 3, 3, 3, 3, 3} | {1, 1, 1, 1, 2, 2, 2, 2, 3, 3, 3, 3, 4, 4, 4, 4} |

A mapping method in a form of complementing advantages and disadvantages in Table 9 and Table 10 may be considered. For example, as in {1,1,2,2,1,1,2,2} when k is 2 and N is 8, it may obtain time diversity compared to a method of Table 10 while reducing the number of spatial relation RS changes compared to a method of Table 9. In another example, as in {1,1,1,1,2,2,2,2,1,1,1,1,2,2,2,2} when K is 2 and N is 16, grouping may be performed in a unit of 4 slots and K spatial relation RSs may be cyclically mapped per each group. In other words, as N slots are grouped into a plurality of groups in a unit of M (a natural number smaller than N) slots and K spatial relation RSs are cyclically mapped per each group, the same spatial relation RS may be mapped to slots in the same group. Such a method makes a feature of configuring a k-th slot group with a plurality of discontiguous slot sub-groups configured with contiguous slots. This method is referred to as 'a hybrid mapping method' for convenience.

A base station may configure one of various slot group configuration methods (or a spatial relation RS set mapping method) to a terminal (e.g., through a RRC message, etc.) as proposed above. Alternatively, a slot group configuration method suitable for a specific use case (or a spatial relation RS set mapping method) may be stipulated/configured. In an example, in multi-slot scheduling, when a TB is repeatedly transmitted (corresponding to a URLLC use case), it may be stipulated/configured to use a full shuffling method. On the other hand, in multi-slot scheduling, when a TB is not repeatedly transmitted, it may be stipulated/configured to use a sequential mapping method. In another example, when a different TU is mapped to contiguous symbols, it may be stipulated/configured to use a sequential mapping method to avoid changing a beam (as much as possible) between adjacent symbols. On the other hand, when a different TU is mapped to discontiguous symbols, it may be stipulated/configured to use a full shuffling mapping method which maximizes diversity.

Likewise, a terminal may be configured with one of various slot group configuration methods (or a spatial relation RS set mapping method) from a base station (e.g., through a RRC message, etc.). Alternatively, a slot group configuration method suitable for a specific use case or a TU allocation situation may be stipulated/configured.

Figure 14:
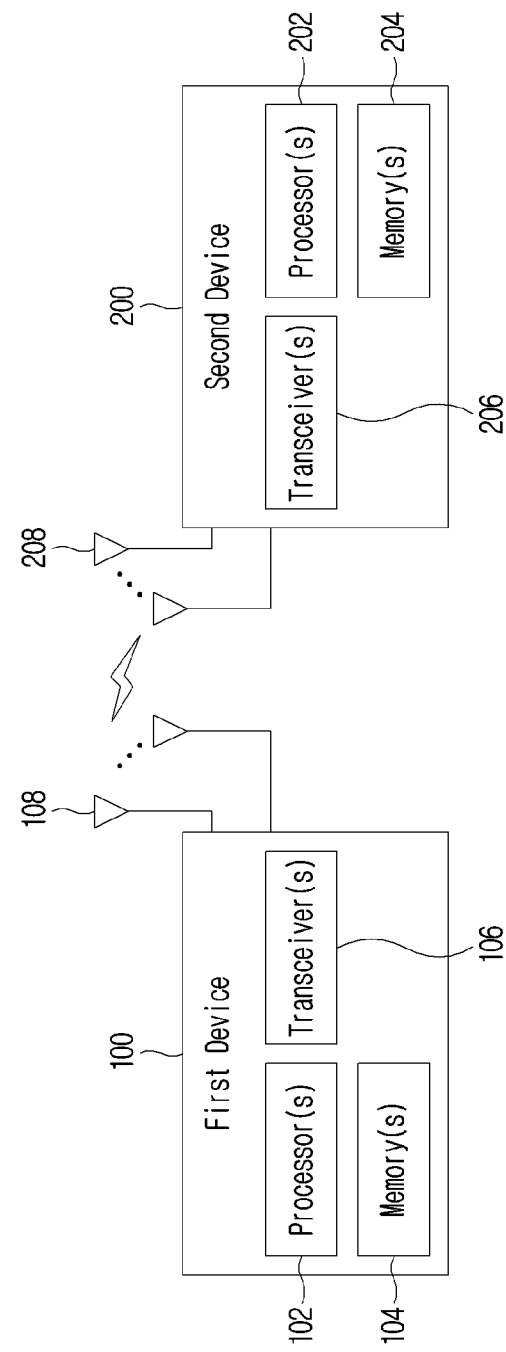
FIG. 14 is a diagram which illustrates a block diagram of a wireless communication device according to an embodiment of the present disclosure.

The above-described proposals according to the present disclosure may be performed by a base station and/or a terminal illustrated in FIG. 14. It is described by assuming a case in which a base station is implemented by a first device 100 and a terminal is implemented by a second device 200.

In particular, with regard to proposal II-1, a processor 102 of a base station 100 configures a N-Slot PUSCH and transmits configuration information to a terminal through a transceiver 106. In addition, a processor 102 partitions N-Slots into K slot groups and determines a spatial relation RS set for each slot group (or determines a terminal beam which will transmit a PUSCH per each slot group or determines a base station beam/TRP/panel which will receive a PUSCH per each slot group). Spatial relation RS set information on each slot group may be stored in a memory 104. In addition, a processor 102 transmits information on a spatial relation RS set determined per each slot group to a terminal through a transceiver 106.

In addition, with regard to proposal II-2, a processor 202 of a terminal obtains information on a method of partitioning N-Slots into K slot groups for a N-Slot PUSCH from a base station through a transceiver 206. Such partitioning information may be stored in a memory 204. In addition, a processor 202 receives N-slot PUSCH scheduling DCI from a base station through a transceiver 206. (According to configured/indicated information) A processor 202 obtains spatial relation RS set information for each slot group. Spatial relation RS set information mapped to each slot group may be stored in a memory 204. In addition, when transmitting a PUSCH (and a DMRS) in each slot group, a processor 202 transmits corresponding PUSCH and PUSCH DMRS antenna ports through a spatial domain filter (or beam) which transmitted a mapped spatial relation RS (antenna port) set if a mapped spatial relation RS (antenna port) set corresponds to an uplink RS. When transmitting a PUSCH (and a DMRS) in each slot group, it transmits corresponding PUSCH and PUSCH DMRS antenna ports by determining and applying a Tx spatial domain filter (or beam) corresponding to a Rx spatial domain filter (or beam) which received a mapped spatial relation RS (antenna port) set if a mapped spatial relation RS (antenna port) set corresponds to a downlink RS.

Embodiment III

In the NR system, one slot may be configured as a DL slot, a UL slot, or a flexible slot through radio resource control (RRC) signaling.

Here, slots configured as flexible slots mean slots in which DL symbols, UL symbols, or both DL symbols and UL symbols exist in one slot (i.e., flexible slot or a DL/UL mixed slot). A flexible slot may be dynamically (changed) indicated to a terminal through lower layer signaling such as DCI (and/or MAC-CE (control element)) according to needs of a network.

In general, in case of a PUCCH resource semi-statically configured through higher layer signaling, a PUCCH resource is also mapped in a slot semi-statically configured as a flexible slot through higher layer signaling. However, if a corresponding slot is dynamically indicated as flexible or DL through dynamic signaling (e.g., DCI), an overlap may occur between a DL portion (or symbol set) indicated when indicated as a flexible slot and a PUCCH symbol set (configured by higher layer signaling). In this case, it can be interpreted that a base station intentionally intends to give priority to DL transmission in a position where a PUCCH resource is mapped. Therefore, it is determined that a terminal drops (i.e., does not transmit) a corresponding PUCCH in a corresponding slot. Specifically, when a PUCCH is (repeatedly) transmitted over multi-slots, the dropping operation is applied to the remaining slots except for the first slot. Here, the first slot is not applied because of an assumption that a base station will guarantee through scheduling to prevent overlap.

Hereinafter, in the present disclosure, as described above, due to a dynamic indication, if it is necessary to drop a PUCCH/PUSCH configured/indicated in advance (through higher layer signaling), a specific time unit(s) (TU: time unit) (or slot), various methods for mapping/applying beam/TRP related information (e.g., spatial relation RS) are proposed.

Hereinafter, for convenience of description, 1 TU (time unit) is assumed to be 1 slot, but is not limited thereto, and the proposals of the present disclosure may be equivalently applied even if 1 TU is changed to several symbols or several slots.

In addition, in the present disclosure, beam/TRP information for a PUCCH/PUSCH is referred to as a spatial relation RS information, but this may be substituted with other terms. This term may be changed/extended according to the evolution of future NR standards, or other terms defined in other standard documents may be used. For example, a UL transmission configuration indicator (TCI), which is likely to be introduced in NR Rel-17, may be utilized to indicate a spatial relation RS for UL like a DL TCI. Therefore, in Rel-17 and later releases, instead of spatial relation information (or spatial relation RS information) in the existing release, a UL TCI may be used instead of a purpose of indicating a UL spatial relation RS. In addition, a UL TCI (especially for beam correspondence UE) may be used in combination with a DL TCI.

For example, in the present disclosure, a spatial relation RS means a reference signal for a transmission beam/filter configuration, when the corresponding reference signal extends/includes another function/role (for example, path-loss reference RS, reference RS for a pane of a terminal panel), the term of a spatial relation RS may be changed to another term.

Alternatively, a spatial relation RS may configure one state information together with information(s) on other functions/roles (e.g., a pathloss reference RS, reference RS for a panel of a terminal, a timing advance, a UL power control parameter(s)), and in this case, it is obvious that a mapping method between TUs (or resource units) and spatial relation RSs in the present disclosure may be applied a mapping method between TUs (or resource units) and corresponding state information.

For convenience of description, a spatial reference RS configured/indicated to be applied in the n-th slot when transmitting a PUCCH/PUSCH in N slots (N is a natural number) is referred to as RS(n)(n=0, . . . , N−1). Here, it is assumed that all RS(n) information to be applied up to the last slot (i.e., (N−1)-th slot) is indicated/configured in at least the 0-th slot or the previous time through higher layer signaling and/or dynamic signaling. If it is assumed that a situation in which a PUCCH should be dropped occurs in the k-th slot (due to issues such as overlap with a DL portion), a spatial reference RS actually applied in the n-th slot is called RS'(n). For determining RS'(n)(n>k+1), it is proposed to apply one of the following methods (or a plurality of them together).

Hereinafter, it is assumed that RS'(n)=RS(n)(n<k) is commonly applied, and as supported by the current NR standard, the following method is applied only in k>0 except for k=0, but the present disclosure is not limited thereto. That is, the proposal of the present disclosure may be extended and applied to the case of k=0, and a different method may be applied to the case where k=0 and the case k>0. In addition, a different method may be applied according to a mapping method between spatial relation RSs and slots in which repeated transmission is performed, for example, a full shuffling, a sequential mapping method, or a hybrid mapping method proposed in the present disclosure.

Hereinafter, in describing the methods according to the present disclosure, a spatial relation RS set means a set of one or a plurality of spatial relation RSs applied to PUSCH/PUCCH transmission in a single TU. Hereinafter, although it may be referred to as a spatial relation RS for convenience of description, the method of the present disclosure is not limited thereto, and a spatial relation RS may be substituted with a spatial relation RS set.

Method III-1) RS(k) may be applied to a subsequent slot or a slot in which a subsequent valid (or available) UL transmission occurs, after the k-th slot. Then, for n>k thereafter, RS(n) may be sequentially applied to a subsequent slot or a valid UL slot. For example, if dropping does not occur after the k-th slot, RS'(n)=RS(n−1)(n≥k+1) may be applied. In other words, in an order of an RS from the existing k-th slot to the (N−1)-th slot, an RS may be applied from the (k+1)-th slot to the N-th slot.

Method III-1 is a method of using a corresponding spatial relation RS to be used in the k-th slot for subsequent transmission because the spatial relation RS to be used in the k-th slot is not applied in the k-th slot. According to this method, even if PUCCH dropping occurs in some PUCCHs during (repeated) transmission over multiple TUs, there is an effect that an intended spatial relation RS can be applied in order.

Specifically, Method III-1 may be limitedly applied only when a spatial relation RS is mapped according to a full shuffling mapping method. In this case, there is an effect that can be applied by changing a spatial relation RS for each slot.

For example, in case of N=4 (N is the total number of slots configuring a PUCCH/PUSCH), K=2 (K is the total number of spatial relation RSs), full shuffling, a spatial relation RS is changed in the form of {1,2,1,2} for each slot. That is, an RS applied to the (n=0)th slot corresponds to RS 1, an RS applied to the (n=1)th slot corresponds to RS 2, and an RS applied to the (n=2)th slot corresponds to RS 1, and an RS applied to the (n=3)th slot corresponds to RS 2.

Here, when dropping occurs at k=1 (i.e., (n=1)th slot) and RS'(n)=RS(n)(n≥k+1) is applied, in the form of {1,1,2}, spatial relation RS 1 may be transmitted in two consecutive slots. That is, in this case, since dropping occurred in the (n=1)th slot, an RS applied to the (n=0)th slot corresponds to RS 1, an RS applied to the (n=2)th slot corresponds to RS 1, and an RS applied to the (n=3)th slot corresponds to RS 2.

However, when the above-described Method III-1 is applied, a spatial relation RS in the form of {1,2,1} can be changed every time. That is, if Method III-1 is applied, since dropping occurred in the (n=1)th slot, an RS applied to the (n=0)th slot corresponds to RS 1, an RS applied to the (n=2)th slot corresponds to RS 2, and an RS applied to the (n=3)th slot corresponds to RS 1.

Alternatively, Method III-1 may obtain an effect of increasing time for continuously maintaining the same spatial relation RS, particularly when a spatial relation RS is mapped according to a sequential mapping or a hybrid mapping method.

For example, it is assumed that spatial relation RSs are configured in the form of N=5, K=2, {1,1,2,2,2}, and dropping occurs at k=1 (i.e., the (n=1)th slot). That is, an RS applied to the (n=0)th slot corresponds to RS 1, an RS applied to the (n=1)th slot corresponds to RS 1, an RS applied to the (n=3)th slot corresponds to RS 2, an RS applied to the (n=4)th slot corresponds to RS 2, and an RS applied to the (n=5)th slot corresponds to RS 2.

Here, when RS'(n)=RS(n)(n≥k+1) is applied, it is changed to the form of {1,2,2,2} so that spatial relation RS 1 is transmitted only in one slot. That is, in this case, since dropping occurred in the (n=1)th slot, an RS applied to the (n=0)th slot corresponds to RS 1, an RS applied to the (n=2)th slot corresponds to RS 2, and an RS applied to the (n=3)th slot corresponds to RS 2, and an RS applied to the (n=4)th slot corresponds to RS 2.

However, when Method III-1 is applied, spatial relation RS 1 in the form of {1,1,2,2} can be maintained longer. That is, if Method III-1 is applied, since dropping occurred in the (n=1)th slot, an RS applied to the (n=0)th slot corresponds to RS 1, an RS applied to the (n=2)th slot corresponds to RS 1, and an RS applied to the (n=4)th slot corresponds to RS 2.

Alternatively, in particular, when the number of slots to which a dropped RS(k) is applied becomes relatively smaller than the number of slots mapped to other spatial relation RS(s) or disappears, the above Method III-1 is limitedly applied. In this case, an effect of evenly applying spatial relation RSs to symbols can be obtained.

For example, it is assumed that a spatial relation RS is configured in the form of N=8, K=3, {1,2,3,1,2,3,1,2} and dropping occurs at k=2 (i.e., (n=2)th slot). That is, an RS applied to the (n=0)th slot corresponds to RS 1, an RS applied to the (n=1)th slot corresponds to RS 2, an RS applied to the (n=2)th slot corresponds to RS 3, and an RS applied to the (n=3)th slot corresponds to RS 1, an RS applied to the (n=4)th slot corresponds to RS 2, an RS applied to the (n=5)th slot corresponds to RS 3, an RS applied to the (n=6)th slot corresponds to RS 1, and an RS applied to the (n=7)th slot corresponds to RS 2.

When RS'(n)=RS(n)(n≥k+1) is applied, a spatial relation RS can be applied in the form of {1,2,1,2,3,1,2} for each slot. That is, spatial relation RS 1 and spatial relation RS 2 are applied in 3 slots, respectively, whereas spatial relation RS 3 is applied only in one slot.

Therefore, in this case, when Method 1 is applied, a spatial relation RS can be applied in the form of {1,2,3,1, 2,3,1}. That is, if Method III-1 is applied, since dropping occurred in the (n=2)th slot, an RS applied to the (n=0)th slot corresponds to RS 1, an RS applied to the (n=1)th slot corresponds to RS 2, an RS applied to the (n=3)th slot corresponds to RS 3, an RS applied to the (n=4)th slot corresponds to RS 1, an RS applied to the (n=5)th slot corresponds to RS 2, and an RS applied to the (n=6)th slot corresponds to RS 3, and an RS applied to the (n=7)th slot corresponds to RS 1. Therefore, spatial relation RS 1 is applied to 3 slots, and spatial relation RSs 2, 3 are applied to 2 slots, so that a spatial relation RS can be applied more evenly.

Method III-2) RS(k) may be applied to a specific slot to which RS(k) is not mapped among subsequent slots or slots in which valid (or available) UL transmission occurs, after the k-th slot, and RS'(n)=RS(n) may be applied to the remaining slots.

Method III-2 is a method for applying spatial relation RSs intended without omission while maintaining spatial relation RS information configured/indicated in a UL resource to be transmitted in the n-th slot as much as possible.

A 'specific one slot' to which RS(k) is applied instead of a spatial relation RS previously configured/indicated in Method III-2 may be determined from among slots that satisfy the following condition to be described later. For example, it may be one of i) a transmission slot valid at the earliest point after the k-th slot, ii) a transmission slot valid at the slowest time, or iii) an arbitrary slot, or iv) a specific determined slot. Here, the specific determined slot, for example, according to a mapping method (e.g., full shuffling or sequential mapping) for spatial relation RSs and slots in which repeated transmission is performed, may be specified as a specific slot location in which the intended effect of the corresponding mapping method is maximally maintained. That is, a specific slot location may be determined according to N value (N is the total number of slots configuring a PUCCH/PUSCH), K value (K is the total number of spatial relation RS (set)), a mapping method for a spatial relation RS, and/or k value (the location (index) of the slot where dropping occurred among the N slots).

Condition) When spatial relation RSs are 3 or more, slot(s) corresponding to a spatial relation RS with a relatively large number of mapped slots among other spatial relation RSs other than RS(k)

For example, among slot(s) corresponding to a spatial relation RS with the largest number of mapped slots among other spatial relation RSs other than RS(k), a RS to be applied in a slot of the later time (last) or the fast time (the first after the k-th slot) may be replaced with RS(k).

This Method III-2 may be particularly limitedly applied when the number of slots to which a dropped RS(k) is applied becomes relatively smaller than the number of slots mapped to other spatial relation RS(s) or disappears. In this case, an effect of evenly applying spatial relation RSs can be obtained.

For example, it is assumed that spatial relation RSs are configured in the form of N=8, K=3, {1,2,3,1,2,3,1,2}, and when dropping occurs at k=2 (i.e., the (n=2)th slot), RS'(n)=RS(n) is applied. In this case, spatial relation RSs are applied in the form of {1,2,1,2,3,1,2} so that spatial relation RS 1 and spatial relation RS 2 are applied in 3 slots, respectively, whereas spatial relation RS 3 is applied only in 1 slot. Therefore, in this case, if Method III-2 is applied and for last slot to which spatial relation RS 2 was applied, it is replaced with spatial relation RS 3 which is RS(k), spatial relation RSs can be applied with the form of {1,2,1,2,3,1,3}. Therefore, since spatial relation RS 1 is applied to 3 slots, and spatial relation RSs 2 and 3 are applied to 2 slots, respectively, spatial relation RSs can be applied more evenly.

Method III-3) A spatial relation RS for a slot in which dropping occurs is skipped, and spatial relation RSs may be sequentially mapped to subsequent slots. For example, assuming that dropping does not occur after the k-th slot, RS'(n)=RS(n)(n≥k+1) may be applied.

When a terminal does not properly receive dynamic signaling in Methods III-1 and III-2, since mismatch of beam information may occur between a base station and a terminal, Method III-3 may be a method to supplement it.

For example, it is assumed that spatial relation RSs are configured in the form of N=8, K=3, {1,2,3,1,2,3,1,2}, and dropping occurs at k=2 (i.e., the (n=2)th slot). Here, when RS'(n)=RS(n)(n≥k+1) is applied, since dropping occurred in the (n=2)th slot, an RS applied to the (n=0)th slot corresponds to RS 1, an RS applied to the (n=1)th slot corresponds to RS 2, an RS applied to the (n=3)th slot corresponds to RS 3, an RS applied to the (n=4)th slot corresponds to RS 1, an RS applied to the (n=5)th slot corresponds to RS 2, an RS applied to the (n=6)th slot corresponds to RS 3, an RS applied to the (n=7)th slot corresponds to RS 1, and an RS applied to the (n=8)th slot corresponds to RS 2.

In addition, in case of a multi-slot PUSCH in the current NR, even in case of TDD, after PUSCH mapping is performed on continuous slots, when a specific slot is configured/indicated semi-statically or dynamically as a DL (or flexible) slot, a PUSCH is defined not to be transmitted in the corresponding slot.

For example, it is assumed that spatial relation RSs are configured with N=4, K=2, {1,2,1,2}. In addition, it is also assumed that slots indicated to transmit a multi-slot PUSCH are semi-statically or dynamically configured/indicated in an order of {UL, DL, UL, DL}. In this case, a PUSCH is transmitted only in the 1st slot and the 3rd slot. And, according to the current spatial relation RS mapping method, only spatial relation RS 1 is applied in both transmissions (1st slot and 3rd slot). This method has a problem that it can be applied differently from an original intention for configuring a spatial relation RS (e.g., maximize diversity through full shuffling or minimize beam change through sequential mapping). In addition, as in the previous example, there is a problem that transmission can be performed by being biased toward a specific spatial relation RS. Therefore, the following method is proposed.

Method III-4) (in case of multi-slot PUSCH) In a slot configuration configured by a TDD configuration or a slot format indicator (SFI), a configured/indicated spatial relation RS may be sequentially applied in an order of valid UL transmission slots. That is, a configured/indicated spatial relation RS may be applied only in a valid UL transmission slot. Here, one of the following two criteria may be applied as a criterion for determining of the 'valid' UL transmission slot.

i) (regardless of dynamic indication) slot(s) in which it can be determined that corresponding PUSCH transmission is possible based on a semi-static configuration ii) slot(s) in which PUSCH transmission is actually performed When Method III-4 is applied, spatial relation RS 1 and spatial relation RS 2 may be applied interchangeably in the 1st slot and 3rd slot in the above-mentioned embodiment, respectively.

In Method III-4, the criterion for determining ii) is a method of sequentially applying spatial relation RSs based on slots in which actual PUSCH transmission is performed. This method may be applied in a similar manner to Method III-1 above when it is suddenly impossible to transmit a PUSCH in a specific UL or flexible slot that was determined to be transmittable due to situations such as dynamic signaling or occurrence of collision. That is, if a PUSCH cannot be transmitted in a specific UL or flexible slot due to situations such as dynamic signaling or occurrence of collision, it may be determined that the corresponding slot is not a 'valid' UL transmission slot. This method may have a disadvantage that beam information mismatch between a base station and a terminal may occur if a terminal does not properly receive a corresponding dynamic signaling.

In method III-4, the criterion for determining i) complements this point and determines valid PUSCH transmission slots based on a semi-static configuration (e.g., RRC and/or MAC-CE). For example, if semi-statically designated as a UL slot or semi-statically designated as a flexible slot and all symbols of a corresponding PUSCH are located in a UL symbol set (or part) of the corresponding flexible slot, a terminal may determine a corresponding slot as a valid PUSCH transmission slot.

Although the above-described Method III-4 has been mainly described with reference to a PUSCH for convenience of description, it is not limited thereto and may be equivalently applied to a case of a PUCCH.

The present disclosure proposes a method of mapping a spatial relation RS when dropping occurs at a specific transmission time when repeatedly transmitting a PUCCH/PUSCH on a time axis, but the method of the present disclosure is limited thereto not. That is, a spatial relation RS may be mapped by applying the same methods as those of Methods III-1 to III-4 described above even in a case of repeatedly transmitting a PUCCH/PUSCH on a frequency axis. For example, in the above description, by replacing the time unit (TU) with a frequency resource unit in which a single uplink channel is transmitted during repeated transmission of N uplink channels, the same methods as those of Methods III-1 to III-4 described above may be applied. Alternatively, a spatial relation RS may be mapped by applying the same methods as Methods III-1 to III-4 described above even in a case of repeated transmission together on a time axis and a frequency axis. For example, in the above description, a spatial relation RS is mapped by first considering an order of time units (TUs) (or groups of time units) in a time domain, then a spatial relation RS may be mapped by considering an order of frequency units (or groups of frequency units) in a frequency domain. Alternatively, conversely, in the above description, a spatial relation RS is mapped by first considering an order of frequency units (or groups of frequency units) in a frequency domain, then a spatial relation RS may be mapped by considering an order of time units (TUs) (or groups of time units) in a time domain.

Figure 11:
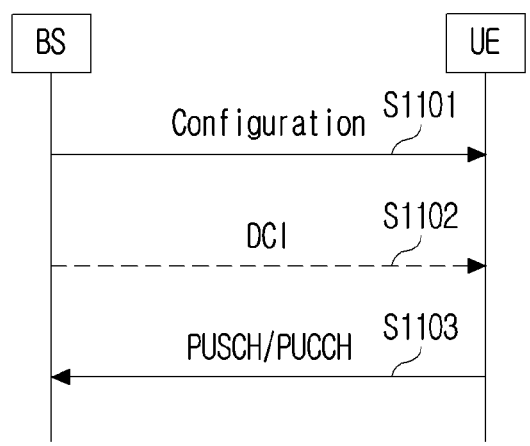
FIG. 11 is a diagram illustrating a method of repeatedly transmitting an uplink channel according to an embodiment of the present disclosure.

FIG. 11 is a diagram illustrating a method of repeatedly transmitting an uplink channel according to an embodiment of the present disclosure.

FIG. 11 exemplifies signaling between a terminal and a base station based on the previously proposed embodiments I, II, and III. Here, a base station and a terminal are only an example, and may be implemented as an apparatus illustrated in FIG. 14 below. In addition, a signaling method in FIG. 11 is only an example for convenience of description, and does not limit the proposals of the present disclosure. In addition, some step(s) illustrated in FIG. 11 may be omitted depending on a circumstance and/or a configuration.

In reference to FIG. 11, a base station (BS) transmits configuration information to a user equipment (UE) (S1101).

That is, a terminal receives configuration information from a base station.

Here, configuration information may be configuration information related to repeated transmission in N (N is a natural number) resource unit (RU) of an uplink channel (e.g., PUCCH, PUSCH). Here, a resource unit may be a time unit (e.g., one slot or a plurality of slots) for repeated transmission in a time domain. Alternatively, a resource unit may be a frequency unit (e.g., one resource block or a plurality of resource blocks) for repeated transmission in a frequency domain. Alternatively, a resource unit may be a time frequency unit (i.e., a combination of a time unit and a frequency unit) for repeated transmission in time and frequency domains.

Here, configuration information may include the number of times of repeated transmission and/or time/frequency/spatial resource information for repeated transmission in uplink N times repeated transmission.

In addition, configuration information may include information for configuring a mapping method between N RUs and K spatial relation reference signals. Alternatively, a plurality of mapping methods may be included in the configuration information, and a specific mapping method may be indicated by lower layer signaling (e.g., DCI and/or MAC CE). In addition, one or more mapping methods between N RUs and K spatial relation reference signals may be predefined, and the configuration information and/or the lower layer signaling (e.g., DCI and/or MAC CE) may indicate a specific mapping method.

In addition, here, a mapping method may include at least one of the above-described the full shuffling method, the sequential mapping method, and/or the hybrid mapping method.

The full shuffling method may mean a method in which the K spatial relation reference signals are sequentially and circularly mapped in an ascending order of an index of each RU of the N RUs.

In addition, the sequential mapping method may mean a method in which the N RUs are grouped into K RU groups, and the K spatial relation reference signals are sequentially mapped in an ascending order of indexes of the RU groups.

In addition, the hybrid mapping method may mean a method in which the N RUs are grouped into RU groups in units of M (M≤N, M is a natural number) RUs (i.e., for each M RUs), and for each RU group, the K spatial relation reference signals are sequentially and circularly mapped in an ascending order of indexes of the RU groups.

A base station transmits a downlink reference signal (DCI) to a terminal (S1102).

That is, a terminal receives DCI from a base station.

Here, DCI may include information triggering the repeated transmission of an uplink channel in N resource units.

In addition, DCI may include scheduling information for downlink channel transmission in the k-th (0≤k≤N−1, k is a natural number) resource unit (RU) among the N resource units. Here, the DCI for triggering the repeated transmission of the uplink channel and the DCI for scheduling the transmission of the downlink channel in the k-th resource unit (RU) may be different.

In addition, among the N resource units, the k-th resource unit (RU) may be configured to be used for downlink channel transmission by higher layer signaling or by a predefined rule. In this case, transmission and reception of DCI for scheduling transmission of a downlink channel in the k-th specific resource unit (RU) may be omitted.

A terminal transmits the uplink channel in the N RUs except for the k-th RU based on the K spatial relation reference signals (S1103).

That is, a base station receives the uplink channel in the N RUs except for the k-th RU based on the K spatial relation reference signals.

Here, as in Method III-1 above, a spatial relation reference signal (i.e., RS(k)) that was configured to be applied in the k-th RU may be applied to a subsequent RU or an RU in which valid (or available) UL transmission occurs, after the k-th RU. That is, a spatial relation reference signal (i.e., RS(n), n>k) configured to be applied to a subsequent RU may be sequentially applied to a subsequent slot or a valid UL slot.

Alternatively, as in Method III-2 above, a spatial relation reference signal (i.e., RS(k)) that was configured to be applied in the k-th RU may be applied to one specific RU to which RS(k) is not mapped among subsequent RUs or RUs in which valid (or available) UL transmission occurs, after the k-th RU. A spatial relation reference signal configured to be applied to a corresponding RU may be equally applied to the remaining RUs, (i.e., RS'(n)=RS(n), n≥k+1).

In addition, a spatial relation RS for the k-th RU in which dropping occurs may be skipped, and a spatial relation RS may be sequentially mapped to subsequent RUs. For example, assuming that dropping does not occur after the k-th RU, a spatial relation reference signal configured to be applied to a corresponding RU may be equally applied to the remaining RUs (i.e., RS'(n)=RS(n), n≥k+1).

In other words, in order to map the K spatial relation reference signals to the n-th (k+1≤n≤N−1) RU, the configured mapping method may be equally applied.

In addition, as in Method III-4, in a mapping of N RUs and K spatial relation RSs, a configured/indicated spatial relation RS may be applied only in a valid UL transmission slot.

That is, the N RUs may include only valid uplink transmission RUs. Here, the valid uplink transmission RU may correspond to an RU determined to be capable of uplink channel transmission based on a configuration by higher layer signaling. Alternatively, the valid uplink transmission RU may correspond to an RU capable of actually transmitting an uplink channel.

Figure 12:
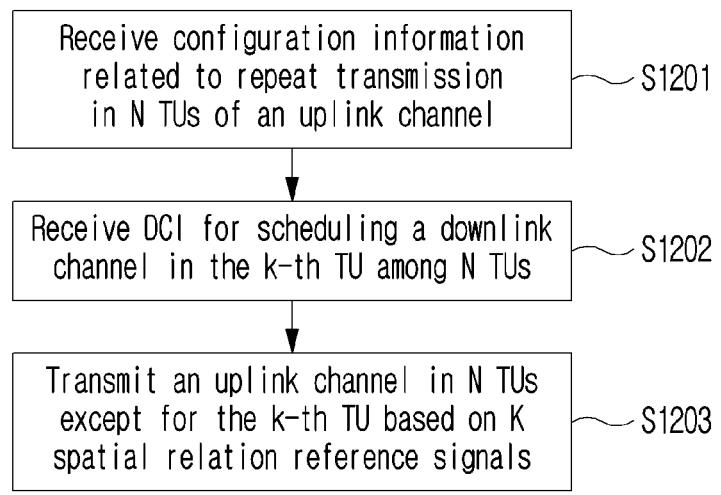
FIG. 12 is a diagram illustrating an operation of a terminal for performing a method of repeatedly transmitting an uplink channel according to an embodiment of the present disclosure.

FIG. 12 is a diagram illustrating an operation of a terminal for performing a method of repeatedly transmitting an uplink channel according to an embodiment of the present disclosure.

FIG. 12 exemplifies an operation of a terminal based on the previously proposed embodiments I, II, and III. Here, a terminal is only an example, and may be implemented as an apparatus illustrated in FIG. 14 below. In addition, an operation method of a terminal in FIG. 12 is only an example for convenience of description, and does not limit the proposals of the present disclosure. In addition, some step(s) illustrated in FIG. 12 may be omitted depending on a circumstance and/or a configuration.

A terminal receives configuration information related to repeated transmission in N (N is a natural number) resource units (RUs) of an uplink channel (e.g., PUCCH, PUSCH) from a base station (S1201).

Here, a resource unit may be a time unit (e.g., one slot or a plurality of slots) for repeated transmission in a time domain. Alternatively, a resource unit may be a frequency unit (e.g., one resource block or a plurality of resource blocks) for repeated transmission in a frequency domain. Alternatively, a resource unit may be a time frequency unit (i.e., a combination of a time unit and a frequency unit) for repeated transmission in time and frequency domains.

Here, configuration information may include the number of times of repeated transmission and/or time/frequency/spatial resource information for repeated transmission in uplink N times repeated transmission.

In addition, configuration information may include information for configuring a mapping method between N RUs and K spatial relation reference signals. Alternatively, a plurality of mapping methods may be included in the configuration information, and a specific mapping method may be indicated by lower layer signaling (e.g., DCI and/or MAC CE). In addition, one or more mapping methods between N RUs and K spatial relation reference signals may be predefined, and the configuration information and/or the lower layer signaling (e.g., DCI and/or MAC CE) may indicate a specific mapping method.

In addition, here, a mapping method may include at least one of the above-described the full shuffling method, the sequential mapping method, and/or the hybrid mapping method.

The full shuffling method may mean a method in which the K spatial relation reference signals are sequentially and circularly mapped in an ascending order of an index of each RU of the N RUs.

In addition, the sequential mapping method may mean a method in which the N RUs are grouped into K RU groups, and the K spatial relation reference signals are sequentially mapped in an ascending order of indexes of the RU groups.

In addition, the hybrid mapping method may mean a method in which the N RUs are grouped into RU groups in units of M (M≤N, M is a natural number) RUs (i.e., for each M RUs), and for each RU group, the K spatial relation reference signals are sequentially and circularly mapped in an ascending order of indexes of the RU groups.

A terminal receives DCI scheduling for transmission of a downlink channel in the k-th (0≤k≤N−1, k is a natural number) resource unit (RU) among the N resource units from a base station (S1202).

In addition, among the N resource units, the k-th resource unit (RU) may be configured to be used for downlink channel transmission by higher layer signaling or by a predefined rule. In this case, the step (S1202) of receiving DCI for scheduling transmission of a downlink channel in the k-th specific resource unit (RU) may be omitted.

A terminal transmits the uplink channel in the N RUs except for the k-th RU based on the K spatial relation reference signals (S1203).

Here, as in Method III-1 above, a spatial relation reference signal (i.e., RS(k)) that was configured to be applied in the k-th RU may be applied to a subsequent RU or an RU in which valid (or available) UL transmission occurs, after the k-th RU. That is, a spatial relation reference signal (i.e., RS(n), n>k) configured to be applied to a subsequent RU may be sequentially applied to a subsequent slot or a valid UL slot.

Alternatively, as in Method III-2 above, a spatial relation reference signal (i.e., RS(k)) that was configured to be applied in the k-th RU may be applied to one specific RU to which RS(k) is not mapped among subsequent RUs or RUs in which valid (or available) UL transmission occurs, after the k-th RU. A spatial relation reference signal configured to be applied to a corresponding RU may be equally applied to the remaining RUs, (i.e., RS'(n)=RS(n), n≥k+1).

In addition, a spatial relation RS for the k-th RU in which dropping occurs may be skipped, and a spatial relation RS may be sequentially mapped to subsequent RUs. For example, assuming that dropping does not occur after the k-th RU, a spatial relation reference signal configured to be applied to a corresponding RU may be equally applied to the remaining RUs (i.e., RS'(n)=RS(n), n≥k+1).

In other words, in order to map the K spatial relation reference signals to the n-th (k+1≤n≤N−1) RU, the configured mapping method may be equally applied.

In addition, as in Method III-4, in a mapping of N RUs and K spatial relation RSs, a configured/indicated spatial relation RS may be applied only in a valid UL transmission slot.

That is, the N RUs may include only valid uplink transmission RUs. Here, the valid uplink transmission RU may correspond to an RU determined to be capable of uplink channel transmission based on a configuration by higher layer signaling. Alternatively, the valid uplink transmission RU may correspond to an RU capable of actually transmitting an uplink channel.

Figure 13:
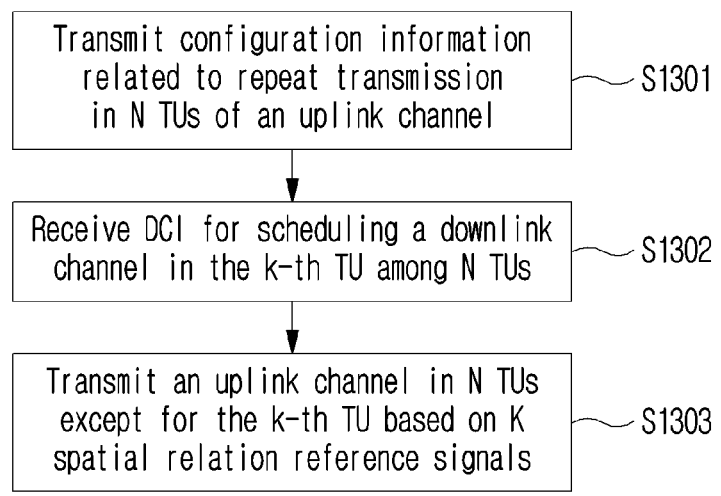
FIG. 13 is a diagram illustrating an operation of a base station for performing a method of repeatedly transmitting an uplink channel according to an embodiment of the present disclosure.

FIG. 13 is a diagram illustrating an operation of a base station for performing a method of repeatedly transmitting an uplink channel according to an embodiment of the present disclosure.

FIG. 13 exemplifies an operation of a base station based on the previously proposed embodiments I, II, and III. Here, a base station is only an example, and may be implemented as an apparatus illustrated in FIG. 14 below. In addition, an operation method of a base station in FIG. 13 is only an example for convenience of description, and does not limit the proposals of the present disclosure. In addition, some step(s) illustrated in FIG. 13 may be omitted depending on a circumstance and/or a configuration.

A base station transmits configuration information related to repeated transmission in N (N is a natural number) resource units (RUs) of an uplink channel (e.g., PUCCH, PUSCH) to a terminal (S1301).

Here, a resource unit may be a time unit (e.g., one slot or a plurality of slots) for repeated transmission in a time domain. Alternatively, a resource unit may be a frequency unit (e.g., one resource block or a plurality of resource blocks) for repeated transmission in a frequency domain. Alternatively, a resource unit may be a time frequency unit (i.e., a combination of a time unit and a frequency unit) for repeated transmission in time and frequency domains.

Here, configuration information may include the number of times of repeated transmission and/or time/frequency/spatial resource information for repeated transmission in uplink N times repeated transmission.

In addition, configuration information may include information for configuring a mapping method between N RUs and K spatial relation reference signals. Alternatively, a plurality of mapping methods may be included in the configuration information, and a specific mapping method may be indicated by lower layer signaling (e.g., DCI and/or MAC CE). In addition, one or more mapping methods between N RUs and K spatial relation reference signals may be predefined, and the configuration information and/or the lower layer signaling (e.g., DCI and/or MAC CE) may indicate a specific mapping method.

In addition, here, a mapping method may include at least one of the above-described the full shuffling method, the sequential mapping method, and/or the hybrid mapping method.

The full shuffling method may mean a method in which the K spatial relation reference signals are sequentially and circularly mapped in an ascending order of an index of each RU of the N RUs.

In addition, the sequential mapping method may mean a method in which the N RUs are grouped into K RU groups, and the K spatial relation reference signals are sequentially mapped in an ascending order of indexes of the RU groups.

In addition, the hybrid mapping method may mean a method in which the N RUs are grouped into RU groups in units of M (M≤N, M is a natural number) RUs (i.e., for each M RUs), and for each RU group, the K spatial relation reference signals are sequentially and circularly mapped in an ascending order of indexes of the RU groups.

A base station transmits DCI scheduling for transmission of a downlink channel in the k-th (0≤k≤N−1, k is a natural number) resource unit (RU) among the N resource units to a terminal (S1302).

In addition, among the N resource units, the k-th resource unit (RU) may be configured to be used for downlink channel transmission by higher layer signaling or by a predefined rule. In this case, the step (S1302) of transmitting DCI for scheduling transmission of a downlink channel in the k-th specific resource unit (RU) may be omitted.

A base station receives the uplink channel in the N RUs except for the k-th RU based on the K spatial relation reference signals (S1303).

Here, as in Method III-1 above, a spatial relation reference signal (i.e., RS(k)) that was configured to be applied in the k-th RU may be applied to a subsequent RU or an RU in which valid (or available) UL transmission occurs, after the k-th RU. That is, a spatial relation reference signal (i.e., RS(n), n>k) configured to be applied to a subsequent RU may be sequentially applied to a subsequent slot or a valid UL slot.

Alternatively, as in Method III-2 above, a spatial relation reference signal (i.e., RS(k)) that was configured to be applied in the k-th RU may be applied to one specific RU to which RS(k) is not mapped among subsequent RUs or RUs in which valid (or available) UL transmission occurs, after the k-th RU. A spatial relation reference signal configured to be applied to a corresponding RU may be equally applied to the remaining RUs, (i.e., RS'(n)=RS(n), n≥k+1).

In addition, a spatial relation RS for the k-th RU in which dropping occurs may be skipped, and a spatial relation RS may be sequentially mapped to subsequent RUs. For example, assuming that dropping does not occur after the k-th RU, a spatial relation reference signal configured to be applied to a corresponding RU may be equally applied to the remaining RUs (i.e., RS'(n)=RS(n), n≥k+1).

In other words, in order to map the K spatial relation reference signals to the n-th (k+1≤n≤N−1) RU, the configured mapping method may be equally applied.

In addition, as in Method III-4, in a mapping of N RUs and K spatial relation RSs, a configured/indicated spatial relation RS may be applied only in a valid UL transmission slot.

That is, the N RUs may include only valid uplink transmission RUs. Here, the valid uplink transmission RU may correspond to an RU determined to be capable of uplink channel transmission based on a configuration by higher layer signaling. Alternatively, the valid uplink transmission RU may correspond to an RU capable of actually transmitting an uplink channel.

General Device to Which the Present Disclosure may be Applied

FIG. 14 is a diagram which illustrates a block diagram of a wireless communication device according to an embodiment of the present disclosure.

In reference to FIG. 14, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL AVAILABILITY

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method of repeatedly transmitting an uplink channel in a wireless communication system, the method performed by a terminal comprising:
   receiving configuration information related to repeat transmission in N (N is a natural number) resource unit (RU) of the uplink channel;
   receiving downlink control information (DCI); and
   transmitting the uplink channel based on the configuration information and the DCI,
   wherein, based on configured mapping method, the N RUs are mapped to K spatial relation reference signals,
   wherein the uplink channel is transmitted based on the K spatial relation reference signals,
   wherein, based on a downlink channel being scheduled in a k-th (0≤k≤N−1, k is a natural number) RU among the N RUs by the DCI, the uplink channel is transmitted in the N RUs except for the k-th RU,
   wherein the configured mapping method is maintained to map the K spatial relation reference signals to the n-th (k+1≤n≤N−1) RU.

2. The method of claim 1, wherein the K spatial relation reference signals are sequentially and circularly mapped in an ascending order of an index of each RU of the N RUs.

3. The method of claim 1, wherein the N RUs are grouped into K RU groups,
   wherein the K spatial relation reference signals are sequentially mapped in an ascending order of an index of the RU group.

4. The method of claim 1, wherein the N RUs are grouped into a plurality of RU groups in M (M≤N, M is a natural number) RU units,
   wherein, for each RU group, the K spatial relation reference signals are sequentially and circularly mapped in an ascending order of an index of the RU group.

5. The method of claim 1, wherein the N RUs include only valid uplink transmission RUs,
   wherein the valid uplink transmission RU corresponds to an RU determined to be capable of transmitting an uplink channel based on a configuration by higher layer signaling.

6. The method of claim 1, wherein the N RUs include only valid uplink transmission RUs,
   wherein the valid uplink transmission RU corresponds to an RU capable of actually transmitting an uplink channel.

7. A terminal for transmitting an uplink channel in a wireless communication system, the terminal comprising:
   at least one transceiver for transmitting and receiving a wireless signal; and
   at least one processor for controlling the at least one transceiver,
   wherein the at least one processor configured to:
   receive configuration information related to repeat transmission in N (N is a natural number) resource unit (RU) of the uplink channel;
   receive downlink control information (DCI); and
   transmit the uplink channel based on the configuration information and the DCI,
   wherein, based on configured mapping method, the N RUs are mapped to K spatial relation reference signals,
   wherein the uplink channel is transmitted based on the K spatial relation reference signals,
   wherein, based on a downlink channel being scheduled in a k-th (0≤k≤N−1, k is a natural number) RU among the N RUs by the DCI, the uplink channel is transmitted in the N RUs except for the k-th RU,
   wherein the configured mapping method is maintained to map the K spatial relation reference signals to the n-th (k+1≤n≤N−1) RU.

8. The terminal of claim 7, wherein the K spatial relation reference signals are sequentially and circularly mapped in an ascending order of an index of each RU of the N RUs.

9. The terminal of claim 7, wherein the N RUs are grouped into K RU groups,
   wherein the K spatial relation reference signals are sequentially mapped in an ascending order of an index of the RU group.

10. The terminal of claim 7, wherein the N RUs are grouped into a plurality of RU groups in M (M≤N, M is a natural number) RU units,
    wherein, for each RU group, the K spatial relation reference signals are sequentially and circularly mapped in an ascending order of an index of the RU group.

11. The terminal of claim 7, wherein the N RUs include only valid uplink transmission RUs,
    wherein the valid uplink transmission RU corresponds to an RU determined to be capable of transmitting an uplink channel based on a configuration by higher layer signaling.

12. The terminal of claim 7, wherein the N RUs include only valid uplink transmission RUs,
    wherein the valid uplink transmission RU corresponds to an RU capable of actually transmitting an uplink channel.

13. A method of repeatedly receiving uplink channel in a wireless communication system, the method performed by a base station comprising:
    transmitting configuration information related to repeat transmission in N (N is a natural number) resource unit (RU) of the uplink channel;
    transmitting downlink control information (DCI); and
    receiving the uplink channel based on the configuration information,
    wherein, based on configured mapping method, the N RUs are mapped to K spatial relation reference signals and the DCI,
    wherein the uplink channel is transmitted based on the K spatial relation reference signals,
    wherein, based on a downlink channel being scheduled in a k-th ($0 \leq k \leq N-1$, k is a natural number) RU among the N RUs by the DCI, the uplink channel is transmitted in the N RUs except for the k-th RU,
    wherein the configured mapping method is maintained to map the K spatial relation reference signals to the n-th ($k+1 \leq n \leq N-1$) RU.

* * * * *